US012182127B2

(12) United States Patent
Manoharan et al.

(10) Patent No.: US 12,182,127 B2
(45) Date of Patent: Dec. 31, 2024

(54) COMPUTING CROSS PRODUCTS USING MAP REDUCE

(71) Applicant: Roblox Corporation, San Mateo, CA (US)

(72) Inventors: Aswath Manoharan, Sunnyvale, CA (US); Nikolaus Sonntag, Foster City, CA (US)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 17/549,602

(22) Filed: Dec. 13, 2021

(65) Prior Publication Data

US 2022/0100753 A1 Mar. 31, 2022

Related U.S. Application Data

(63) Continuation of application No. 16/259,532, filed on Jan. 28, 2019, now Pat. No. 11,200,238.

(51) Int. Cl.
*G06F 16/2455* (2019.01)
*G06F 16/182* (2019.01)
*G06F 16/22* (2019.01)
*G06F 16/2458* (2019.01)
*G06F 17/16* (2006.01)

(52) U.S. Cl.
CPC ........ *G06F 16/2456* (2019.01); *G06F 16/182* (2019.01); *G06F 16/2237* (2019.01); *G06F 16/2471* (2019.01); *G06F 17/16* (2013.01)

(58) Field of Classification Search
CPC ............. G06F 16/2456; G06F 16/2471; G06F 16/182; G06F 16/2237; G06F 17/16
See application file for complete search history.

(56) References Cited

U.S. PATENT DOCUMENTS

| | | | | |
|---|---|---|---|---|
| 2008/0086442 | A1* | 4/2008 | Dasdan | ................. G06F 16/278 |
| 2009/0055370 | A1* | 2/2009 | Dagum | ................. G06F 16/182 |
| 2012/0226639 | A1* | 9/2012 | Burdick | ................ G06F 9/4843 |
| | | | | 706/12 |
| 2013/0159282 | A1 | 6/2013 | Day et al. | |
| 2013/0179466 | A1* | 7/2013 | Mizobuchi | .......... G06F 16/9535 |
| | | | | 707/770 |
| 2014/0081918 | A1 | 3/2014 | Srivas et al. | |
| 2015/0149498 | A1* | 5/2015 | Agarwal | ............. G06F 16/2471 |
| | | | | 707/765 |

(Continued)

OTHER PUBLICATIONS

International Search Report and Written Opinion mailed on May 25, 2020, on application No. PCT/US2020/015062.

(Continued)

*Primary Examiner* — Apu M Mofiz
*Assistant Examiner* — Farhad Agharahimi
(74) *Attorney, Agent, or Firm* — Lowenstein Sandler LLP

(57) ABSTRACT

A request to perform a set of map reduce jobs that generate a plurality of cross products from a dataset based on a join field is received. The join field indicates that each of the plurality of cross products is to be generated from a corresponding subset of the dataset. Responsive to receiving the request to perform the set of map reduce jobs, the set of map reduce jobs on the dataset to generate the plurality of cross products is performed. The final output data of the set of map reduce jobs is stored. The final output data comprises the plurality of cross products.

20 Claims, 10 Drawing Sheets

(56) References Cited

U.S. PATENT DOCUMENTS

2016/0364273 A1* 12/2016 Liu ................... G06F 9/5066
2017/0195409 A1   7/2017 Amrhein et al.
2018/0285440 A1* 10/2018 Gupta ............... G06F 16/2471
2019/0294717 A1*  9/2019 Dar ................... G06F 16/2456

OTHER PUBLICATIONS

Blanas S, Patel JM, Ercegovac V, Rao J, Shekita EJ, Tian Y. A comparison of join algorithms for log processing in mapreduce. InProceedings of the 2010 ACM SIGMOD International Conference on Management of data Jun. 6, 2010 (pp. 975-986).
Supplemental European Search Report mailed on Sep. 15, 2022, on application No. 20748804.2-1203.

\* cited by examiner

COMPUTING CROSS PRODUCTS USING MAP REDUCE

RELATED APPLICATION

This application is a continuation application of U.S. patent application Ser. No. 16/259,532, filed Jan. 28, 2019, the entire contents of which are hereby incorporated by reference herein.

TECHNICAL FIELD

This disclosure relates to the field of data processing systems and, in particular, to computing cross products using a map reduce framework.

BACKGROUND

Large-scale data processing includes extracting data of interest from raw data in one or more datasets and processing the raw data into a useful data product. Large-scale data processing in parallel and distributed processing environments typically includes the distribution of data and computations among multiple disks and processing devices to make efficient use of aggregate storage space and computing power.

DESCRIPTION OF DRAWINGS

Various embodiments of the disclosure will be understood more fully from the detailed description given below and from the accompanying drawings of various embodiments of the disclosure.

DETAILED DESCRIPTION

Figure 1:
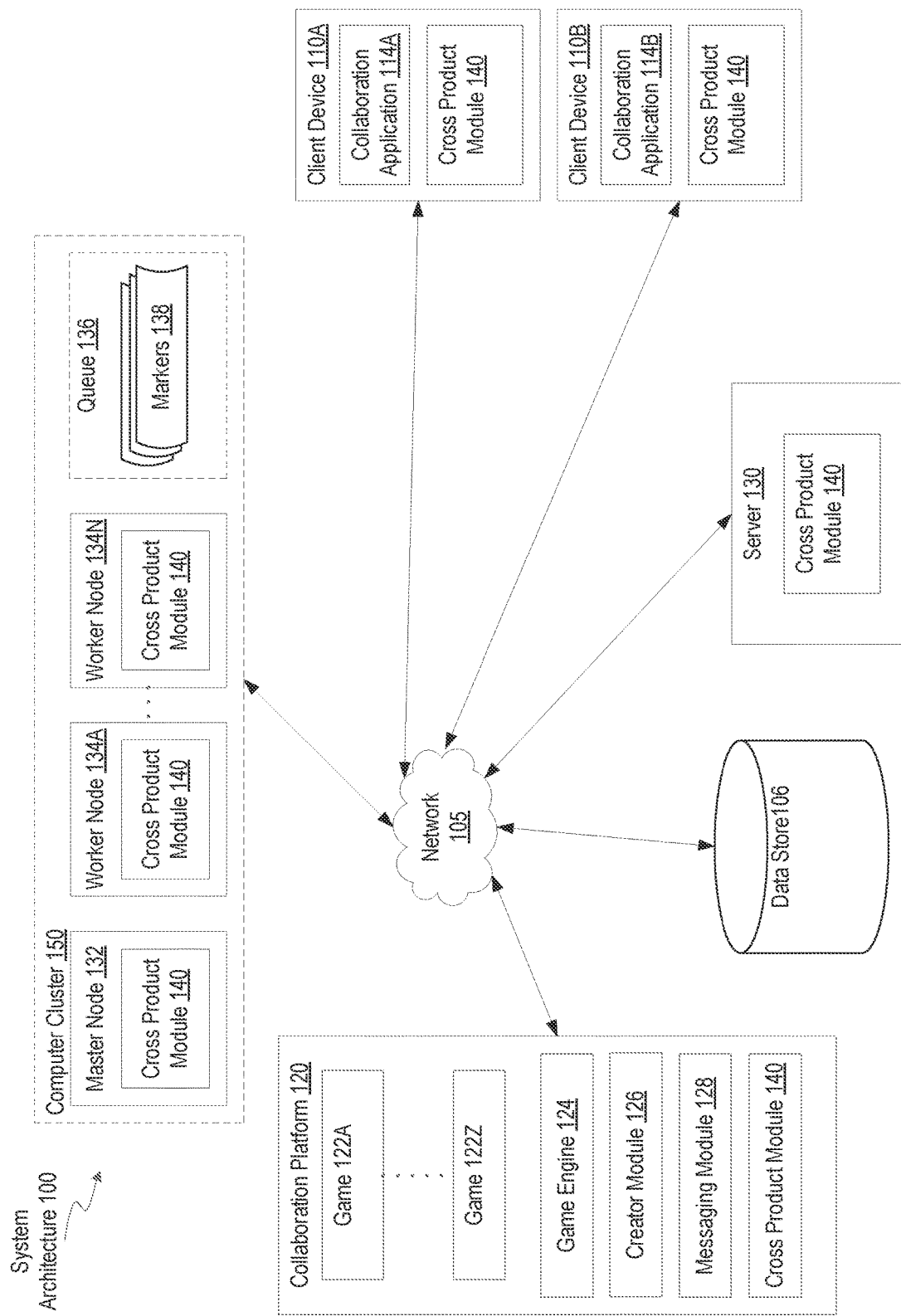
FIG. 1 illustrates an example system architecture, in accordance with embodiments of the disclosure.

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Aspects of the present disclosure are directed to cross product generation using the map reduce framework. Modern data centers often comprise thousands of hosts that operate collectively to service requests from even larger numbers of remote clients. During operation, components of these data centers can produce significant volumes of machine-generated data. Often the data can be transformed into a useful data product, and the transformed data can be used in downstream processes, such as input to a trained machine learning model or used to perform particular operations, such as similarity analysis, scoring analysis, and so forth.

One such data transformation is a cross-product (also referred to as a "Cartesian product"). A cross product can refer to a set of values derived from an operation (e.g., cross product operation) that pairs every value of a dataset with every other value of the same dataset or every value of another one or more datasets. For example, a dataset A may include 4 entries: {value 1, value 2, value 3, value 4}. The cross product of dataset A pairs each value of dataset A with every remaining value of dataset A. The cross product of dataset A includes the set of values: {[value1, value 2], [value 1, value 3], [value 1, value 4], [value 2, value 3], [value 2, value 4], [value 3, value 4]}. Creating cross products using large datasets can consume large amounts computer resources such as computational, memory, and storage resources.

Map reduce is a programming framework for the processing and generating of large datasets in parallel using a computer cluster(s). A map reduce job includes a map task and a reduce task. A map task can include one or more map operations. A reduce task can include one or more reduce operations. A map tasks performs the filtering and storing of a dataset, and a reduce task performs a summary operation.

In some instances, a single cross product derived from all the data of a dataset may not be a useful data product. Rather a useful data product can include multiple cross products that are generated from a dataset where each of the cross products is based on a particular value (e.g., joined on a particular key). For example, a dataset can have the 5 entries with the following values: [User 1: IP 1], [User 2: IP1], [User 3: IP1], [User 1: IP2], [User 2: IP2]. A cross product for the entire dataset pairs each of the five values with every other value. Multiple cross products for the dataset that are each based on a particular value (e.g., joined on a particular key) generate a cross product for values with "IP1" {[User 1: IP1, User 2: IP1], [User 1: IP1, User 3: IP1], [User 2: IP1, User 3: IP1]} and another cross product for "IP2" {[User 1: IP2], [User 2: IP2]}.

In some conventional system, map reduce can be used to generate a single cross product for all values of the dataset(s). Datasets can be large, and generating a cross product with a large dataset produces an even larger dataset. For a cross product of dataset having 1 million entries, the resultant cross product can have 1 trillion entries. Generating a single cross product for all the values of the dataset, especially large datasets, using map reduce can be inefficient and consume large amounts of computational resources, memory resources, and storage resources. In other conventional systems, a dataset can be split into many datasets by value, so that each dataset has entries that contain the particular value. A map reduce job (or set of jobs) can be run on each dataset to generate the cross product for each dataset. However, for large datasets splitting the datasets in the above manner can produce thousands and even millions of smaller datasets. A map reduce job (or set of jobs) can be created for each of the smaller datasets, which in and of itself can be impractical or untenable. The separate map reduce jobs are often run serially, which can be slow and an inefficient use of computer resources. Additionally, it can be challenging to perform efficient parallel processing when using map reduce to generate a cross product. For example, data can be skewed such that data associated with a particular value (e.g., key) can be much larger than other data associated with a different value (e.g., key). Data skew can cause inefficient use of computational resources in a map reduce framework because some processing nodes can spend large amounts of time processing large data blocks, while other nodes sits idle after processing small data blocks.

Aspects of the disclosure address the above and other challenges by generating multiple cross products for the dataset that are each based on a join field. The join field can indicate that keys of key-value pairs are to be generated based on a particular data field of the entries of a dataset (e.g., joined on a particular key). If the values in the data field identified by the join field are the same, the keys of the resultant key-value pairs are identical. Cross products can be generated for groups of key-value pair that have identical keys, such that multiple cross products for the dataset that are each based on a particular value.

In some embodiments, the set of map reduce jobs transform the dataset into multiple groups of key-value pairs where each group of key-value pair share an identical key. The set of map reduce jobs performed on a dataset can further produce multiple cross products, where each cross product is for a group of key-value pairs that have identical keys, and cross products for key-value pairs that do not share identical keys are not generated.

In embodiments, the set of map reduce jobs modifies the keys of a group of key-value pairs so as to control the number of key-value pairs that are sent to any one reducer. By controlling the number of key-value pairs sent to any one reducer, the computational load of generating cross products is spread out among available reducers, which allow the cross products to be calculated faster and use computational, memory, and storage resources more efficiently.

Accordingly, the technology described herein allows for the generation of multiple cross products from a dataset using a set of map reduce jobs. The aforementioned reduces computational resources (e.g., processing resources), memory resources, and storage resources by creating cross products based on a join field, which produces cross products that are each based on a particular value (e.g., joined on a particular key), rather than a single cross product for the entire dataset, and by modifying key names to control the number of key-value pairs that are processed by reducers in downstream map reduce operations.

FIG. 1 illustrates an example system architecture 100, in accordance with embodiments of the disclosure. The system architecture 100 (also referred to as "system" herein) includes client devices 110A and 110B (generally referred to as "client device(s) 110" herein), a network 105, a data store 106, a collaboration platform 120, server 130, and computer cluster 150. It may be noted that system architecture 100 is provided for illustration, rather than limitation. In embodiments, the system architecture 100 may include the same, fewer, more, or different components configured in the same or different manner.

In one embodiment, network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one embodiment, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

In embodiments, the server 130 may be one or more computing devices (e.g., a rackmount server, a server computer, cluster of physical servers, etc.). In embodiments, the server 130 may be included in the collaboration platform 120, be an independent system, or be part of another system or platform. The server 130 may include cross product module 140.

In some embodiments, the collaboration platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to perform operations of the collaboration platform 120 and to provide users with access to collaboration platform 120.

In embodiments, the collaboration platform 120 may also include a website (e.g., a webpage) or application back-end software that may be used to provide users with access to content provided by collaboration platform 120. For example, users may access collaboration platform 120 using collaboration application 114 on client devices 110. It may be noted that collaboration application 114A and 114B may generally referred to as collaboration application(s) 114 herein. In some embodiments, collaboration application 114 may be two instances of the same application.

In embodiments, collaboration platform 120 may be a type of social network providing connections between users or a type of user-generated content system that allows users (e.g., end-users or consumers) to create content for the platform, where the created content may also be consumed by other users of the system. In embodiments of the disclosure, a "user" may be represented as a single individual. However, other embodiments of the disclosure encompass a "user" (e.g., creating user) being an entity controlled by a set of users or an automated source. For example, a set of individual users federated as a community or group in a user-generated content system may be considered a "user."

In one embodiment, collaboration platform 120 may be a gaming platform, such as an online gaming platform or a virtual gaming platform. For example, the gaming platform may provide single-player or multiplayer games to a community of users that may access or interact with the games 122A-122Z using client devices 110 via network 105. In embodiments, games 122 (also referred to as "video game," "online game," or "virtual game" herein) may be two-dimensional (2D) games, three-dimensional (3D) games (e.g., 3D user-generated games using creator module 126), virtual reality (VR) games, or augmented reality (AR) games, for example. In embodiments, users, such as playing users may participate in gameplay with other playing users. In embodiments, a game 122 may be played in real-time with other users of the game 122.

In some embodiments, a game 122 can include an electronic file that can be executed or loaded using software, firmware or hardware configured to present the game content (e.g., digital media item) to an entity. In embodiments, a game 122 may be executed and rendered using a game engine 124. In some embodiments, a game 122 may have a common set of rules or common goal, and the environments of a game 122 share the common set of rules or common goal. In embodiments, different games may have different rules or goals from one another.

It may be noted that collaboration platform 120 hosting games 122, is provided for purposes of illustration, rather than limitation. In some embodiments, collaboration platform 120 may host one or more media items. Media items can include, but are not limited to, digital video, digital movies, digital photos, digital music, audio content, website content, social media updates, electronic books, electronic magazines, digital newspapers, digital audio books, electronic journals, web blogs, real simple syndication (RSS) feeds, electronic comic books, software applications, etc. In embodiments, a media item may be an electronic file that can be executed or loaded using software, firmware, or hardware configured to present the digital media item to a user.

In some embodiments, collaboration platform 120 or client devices 110 may include a game engine 124. In embodiments, game engine 124 may be used for the development or execution of games 122. For example, game engine 124 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 124 may generate commands that help compute and render the game 122 (e.g., rendering commands, collision commands, physics commands, etc.) In some embodiments, game engine 124 of client devices 110 may work independently, in collaboration with game engine 124 of collaboration platform 120, or a combination of both.

In embodiments, collaboration platform 120 may include a creator module 126. In embodiments, creator module 126 may allow users of the collaboration platform 120 to become creating user that design or create environments in an existing game 122, create new games, or create new game objects within games or environments.

In embodiments, creator module 126 may allow a user to create, modify, or customize characters. In embodiments, characters (or game objects generally) are constructed from components, one or more of which may be selected by the user, that automatically join together to aid the user in editing. One or more characters (also referred to as an "avatar" or "model" herein) may be associated with a user (also referred to as a "playing user" herein) where the user may control the character to facilitate a user's interaction with the game 122. In embodiments, a character may include components such as body parts (e.g., hair, arms, legs, etc.) and accessories (e.g., t-shirt, glasses, decorative images, tools, etc.). In embodiments, body parts of characters that are customizable include head type, body part types (arms, legs, torso, and hands), face types, hair types, and skin types, among others. In embodiments, the accessories that are customizable include clothing (e.g., shirts, pants, hats, shoes, glasses, etc.), weapons, or other tools. In embodiments, the user may also control the scale (e.g., height, width, or depth) of a character or the scale of components of a character. In embodiments, the user may control the proportions of a character (e.g., blocky, anatomical, etc.). It may be noted that is some embodiments, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In embodiments, collaboration platform 120 executing creator module 126 includes a user-interfacing website or application (e.g., collaboration application 114) where users (also referred to as "creating users," "creators," "owners," or "owning users" herein) may access online computational resources (e.g., cloud resources) hosted by collaboration platform 120 for the purposes of building, administrating, editing, and interacting with personally owned games 122 or gaming environments. In embodiments, creator module 126 includes tools available to users for creating and instantiating three-dimensional virtual games or environments. In embodiments, creator module 126 is available to users that wish to create and administer their own private virtual game 122. In embodiments, a user may access creator module 126 using collaboration application 114. In embodiments, creator module 126 may use a user interface (also referred to as a "developer interface" herein) via collaboration application 114 to allow users access the functionality of creator module 126. In embodiments, the developer interface may be part of collaboration application 114. For example, a developer interface of collaboration application 114 may allow a user access to a library of game objects that may be selected by the user to build a game environment or build a game 122. The user may publish their game objects via the developer interface so that the game is available to users of collaboration platform 120.

In embodiments, collaboration platform 120 may include messaging module 128. In embodiments, messaging module 128 may be a system, application, or module that allows users to exchange electronic messages via a communication system, such as network 105. Messaging module 128 may be associated with collaboration application 114 (e.g., module of collaboration application 114 or be a separate application). In embodiments, users may interface with messaging module 128 and exchange electronic messages among users of collaboration platform 120. Messaging module 128 may be, for example, an instant messaging application, a text messaging application, an email application, a voice messaging application, a video messaging application, or a combination thereof, among others.

In embodiments, messaging module 128 may facilitate the exchange of electronic messages between users. For example, a user may be logged into a messaging application on client device 110A, and another user may be logged into a messaging application on client device 110B. The two users may start a conversation, such as an instant messaging conversation. Messaging module 128 may help facilitate the messaging conversation by sending and receiving the electronic messages between the users of collaboration platform 120. In another embodiment, two users may use respective messaging applications to participate in in-game dialog with one another where the dialog may be part of the view that includes the gameplay.

In embodiments, the client devices 110A through 110B may each include computing devices such as personal computers (PCs), mobile devices (e.g., laptops, mobile phones, smart phones, tablet computers, or netbook computers), network-connected televisions, gaming consoles, etc. In some embodiments, client devices 110A through 110B may also be referred to as "user devices." In embodiments, one or more client devices 110 via collaboration application 114 may connect to collaboration platform 120 at any given moment. It may be noted that the number of client devices 110 is provided as illustration, rather than limitation. In embodiments, any number of client devices 110 may be used.

In embodiments, each client device 110 may include an instance of collaboration application 114. In one embodiment, the collaboration application 114 may be an application that allows users to use and interact with collaboration platform 120, such as control a virtual character in a virtual game hosted by collaboration platform 120, or view or upload content, such as games 122, images, video items, web pages, documents, and so forth. In one example, the collaboration application 114 may be a web application (e.g., an application that operates in conjunction with a web browser) that can access, retrieve, present, or navigate content (e.g., virtual character in a virtual environment, etc.) served by a web server. In another example, collaboration application 114 may be a native application (e.g., a mobile application, or a gaming program) that is installed and executes local to client device 110 and allows users to interact with collaboration platform 120. The collaboration application 114 may render, display, or present the content (e.g., a web page, a media viewer) to a user. In an embodiment, the collaboration application 114 may also include an embedded media player (e.g., a Flash® player) that is embedded in a web page.

In general, functions described in one embodiment as being performed by the collaboration platform 120 can also be performed by the client devices 110A through 110B, or server 130, in other embodiments if appropriate. In addition, the functionality attributed to a particular component can be performed by different or multiple components operating together. The collaboration platform 120 can also be accessed as a service provided to other systems or devices through appropriate application programming interfaces (APIs).

In embodiments, collaboration platform 120 can generate large amounts of data in the operation of the collaboration platform 120. For example, collaboration platform 120 may have millions of users participating in user sessions each day to play or create games 122. Large amounts of raw data related to the user sessions may be stored in one or more databases associated with data store 106. A session (also referred to as "user session" herein) may refer to a period of time that begins at the opening of an application (e.g., collaboration application 114) to access the collaboration platform 120 and ends at the closing of the application. In some embodiments, the session may span for a period of time (e.g., time range) that starts when the application is opened and a user is interacting with collaboration platform 120. The session may end when the user is inactive for a threshold period of time (e.g., even if the application is still open). Session information may include contextual information descriptive of a particular session (e.g., start and end timestamps, client device type, internet protocol address used to access collaboration platform 120, etc.) and include user activity information descriptive of user interaction with the collaboration platform 120 (e.g., user inputs to control character actions, text messages, etc.).

In embodiments, a cross product of a dataset may be determined using cross product module 140. Cross product module 140 may use a set of map reduce jobs to determine the cross product of one or more datasets. A map reduce job may refer to the two phases of map reduce (e.g., map phase and reduce phase). In the mapping phase, one or more map operations (e.g., map task(s)) retrieve data (e.g., key-value pairs) from input data files and produce intermediate data values in accordance with mapping operations. In the reduce phase, one or more reduce operations (e.g., reduce task(s)) merge or otherwise combine the intermediate data values in accordance the reduce operations (e.g., combining intermediate values that share the same key) to produce output data. A set of map reduce jobs can refer two or more map reduce jobs, often performed serially. For example, two map reduce jobs performed serially may include a first map reduce job (e.g., mapping phase and reduce phase) that produces an output that is used as input to the second map reduce job (e.g., another mapping phase and another reduce phase).

In some embodiments, a system for large-scale processing of data in a parallel processing environment includes one or computer clusters 150. It can be noted that computer cluster 150 is illustrated as a single cluster for purposes of illustrations rather than limitation. Computer cluster 150 may include one or more computer clusters. In embodiments, computer cluster 150 includes one or more interconnected nodes 132 and 134A through 134N to perform a common task so that the computer cluster 150 may be viewed as a single computer system. For example, computer cluster 150 includes master node 132 (generally referred to as "node 132") and worker nodes 134A-134N (generally referred to as "node(s) 134" or "worker node(s) 134"). Each node 132 and 134 of computer cluster 150 may include, but is not limited to, any data processing device, such as a processor, a desktop computer, a laptop computer, a mainframe computer, a personal digital assistant, a server computer, a hand-held device, or one or more die of a multi-die processor, or any other device configured to process data. The nodes 132 and 134 of the computer cluster 150 may be connected to each other through a network, such as network 105. Each node 132 and 134 may be running its own instance of an operating system.

In embodiments, each node 132 and 134 of computer cluster 150 may have its own physical or virtual memory. Memory may include, but is not limited to, main memory such as, read-only memory (ROM), flash memory, dynamic random access memory (DRAM), or static random access memory (SRAM). Each node of computer cluster 150 may have data stored on local storage (not shown), such as local storage disks. Computer cluster 150, and each node 132 and 134 of computer cluster 150, can further implement various network-accessible server-based functionalities (not shown) or include other data processing equipment.

In some embodiments, master node 132 may control aspects of a map reduce job. For example, the master node 132 may determine how many map operations to use, how many reduce operations to use, which processes and processing devices (e.g., nodes) to use to perform the operations, where to store the intermediate data and the output data, how to respond to processing failures, etc. The master node 132 may direct the one or more worker nodes 134 to perform various operations of a map-reduce job. It may be noted that a single map reduce job may run on one or more nodes 134 of computer cluster 150 in parallel.

Nodes 134 of computer cluster can perform map operations, reduce operations, or both. An individual node 134 can perform one or more mapping operations in parallel or serially. An individual node 134 can perform one or more reduce operations in parallel or serially. "Mapper" can refer to a node 134 that performs one or more map operations. "Reducer" can refer to a same or different node 134 that performs one or more reduce operations. In some embodiments, a single node 134 can include one or more mappers, one or more reducers, or both.

In embodiments, the computer cluster 150 may run a map reduce framework. The computer cluster 150 may be configured to run a specific map reduce framework, such as, Apache™ Hadoop®, Hazelcast®, MongoDB®, Infinispan, or Apache™ Spark™.

The computer cluster 150 may be associated with one or more queues 136. A queue 136 can include a data structure that stores elements. Queue 136 may help computer cluster 150 with scheduling information associated with one or more map reduce jobs.

In some embodiments, the elements stored in queue 136 may include markers 138. In some examples, markers 138 include the actual data units on which computer cluster 150 performs one or more map reduce operations. In other examples, markers 138 may identify locations of data units stored at data store 106. For instance, each marker 138 may be associated with one or more rows of data in a database. Each marker 138 may identify the database, a beginning address of data (e.g., a beginning row in the database), and an ending address of data (e.g., an ending row in the database). For instance, a marker 138 may be associated with rows one through 10,000 in a database. Each marker 138 may identify a fixed size address range. For example, a first marker may identify rows 1-10,000 of a database and a second marker may identify rows 10,001-20,000 of the database.

In embodiments, the elements in the queue 136 may be kept in an order and operations on the data structure may include the addition of elements to the data structure and removal of elements from the data structure. For example, the queue 136 may be a First-In-First-Out (FIFO) queue where the first element added to the queue will be the first element to be removed from the queue.

In some embodiments, the queue 136 is hosted by the computer cluster 150, such as master node 132. In other embodiments, queue 136 may be hosted by another component. For example, the queue 136 may be hosted by a component external to the computer cluster 150. Data of the queue 136 may be stored at a memory (e.g., random access memory), a cache, a drive (e.g., a hard drive), a flash drive, a database system, or another type of component or device capable of storing data.

In some embodiments, a user using client device 110 may submit a request for one or more map reduce jobs to be performed by computer cluster 150. Master node 132 of computer cluster 150 may receive the map reduce job and determine the map-reduce operations to perform and request one or more worker nodes 134 to execute the various map-reduce operations. In embodiments, aspects of the present disclose may be implemented by cross product module 140 executed by master node 132. In other embodiments, cross product module 140 executed by master node 132, worker nodes 134, or both may implement aspects of the present disclosure.

For the sake of illustration, rather than limitation, cross product module 140 is described as implemented at master node 132. In other embodiments, cross product module 140 may in part or wholly be implemented at collaboration platform 120. In other embodiments, cross product module 140 may in part or wholly be implemented at one or more client devices 110. In other embodiments, cross product module 140 operating at one or more of client device 110, computer cluster 150, or collaboration platform 120 may work in conjunction to perform the operations described herein. Although embodiments of the disclosure are discussed in terms of collaboration platforms, embodiments may also be generally applied to any type of platform generating or storing data. The cross product module 140 may help facilitate the operations described herein, such as operations described with respect to FIGS. 2-4. In some embodiments, the cross product module 140 may be part of another application, such as a plug-in. In some embodiments, cross product module 140 may be a separate application executing on a computing device.

In situations in which the systems discussed here collect personal information about users, or may make use of personal information, the users may be provided with an opportunity to control whether the collaboration platform 120 collects user information (e.g., information about a user's social network, social actions or activities, profession, a user's preferences, or a user's current location), or to control whether or how to receive content from the collaboration platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the collaboration platform 120.

Figure 2:
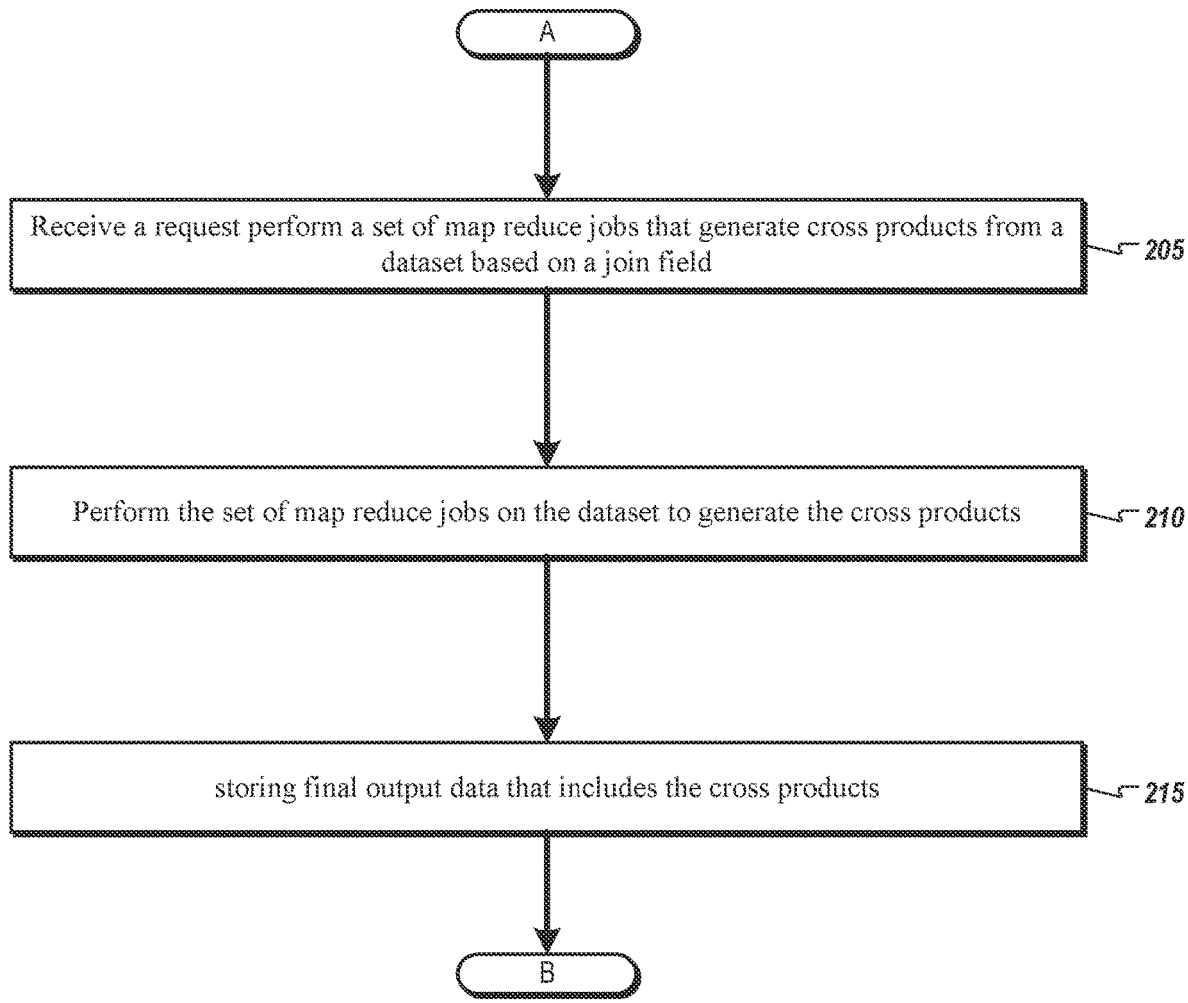
FIG. 2 is a flow diagram that illustrates a method for generating cross products based on a join field, in accordance with embodiments of the disclosure.

FIG. 2 is a flow diagram illustrating method 200 for generating cross products based on a join field, in accordance with embodiments of the disclosure. Method 200 may be performed by processing logic that includes hardware (e.g., circuitry, dedicated logic, programmable logic, microcode), software (e.g., instructions run on a processing device to perform hardware simulation), or a combination thereof. In some embodiments, cross product module 140 executing at computer cluster 150 (e.g., at one or more of node 132 or nodes 134) may perform some or all the operations. In other embodiments, cross product module 140 executing at collaboration platform 120, client device 110A, client device 110B, server 130 or combination thereof may perform some or all the operations. It may be noted that the in some embodiments, method 200 may include the same, different, fewer, or a greater number of operations performed in any order.

At block 205 of method 200, processing logic performing method 200 receives a request to perform a set of map reduce jobs to generate cross products from a dataset based on a join field. The join field indicates that each of the cross products is to be generated from a corresponding subset of the dataset. Each of the subsets is associated with identical keys, and different subsets are associated with different keys.

In some embodiments, the join field indicates that each of the cross products is to be generated on a per-key basis such that each of the cross products is to be generated from a corresponding subset associated with the identical key rather than generated from data of the dataset associated with different keys.

In some embodiments, the request (e.g., single request) is received from a client device 110 that requests a set of map reduce jobs for the generation of cross products of a dataset. A dataset includes one or more entries, and each entry of the dataset includes data specific to the particular entry. The request can include a join field parameter (e.g. "IP") that indicates that the cross products are to be generated on the join field (e.g., on "IP") such that a cross-product is created for each subset of entries of the dataset that are associated with an identical key, but not across entries of the dataset that are associated with different keys. For example, each entry in a subset of the dataset includes the data "IP1", and each entry in another subset of the dataset includes the data "IP2." A cross product is generated for the subset of data associated with "IP1" and another cross product is generated for the subset of data associated with "IP2," but no cross products are generated for the dataset that would pair an entry containing "IP1" with an entry containing "IP2."

At block 210, responsive to receiving the request to perform a set of map reduce jobs to generate the cross products of the dataset based on the join field, processing logic performs a set of map reduce jobs on the dataset to generate the cross products. To perform the set of map reduce jobs, processing logic generates groups of key-value pairs from the corresponding subsets of the dataset. Each key-value pair of a respective group of key-value pairs includes an identical key.

It can be noted than an entry of a dataset can be converted to a key-value pair using one or more mapping operations of map reduce job. In some embodiments, some data of entry is used as the key, and the entire data of the entry is kept and becomes the value in the key-value pair. The join field indicates which data of the entry is to become the key. If the key data in multiple entries is the same, those entries will generate key-value pairs that have the same or identical keys. Performing the set of map reduce jobs is further described with respect to FIGS. 3 and 4A-4F.

At block 215, processing logic stores the final output data of the set of map reduce jobs, the final output data including the cross products for each of the groups of key-value pairs. A cross product pairs each value of the respective group of key-value pairs with each remaining value of the respective group of key-value pairs to form pairs of values (e.g., value pairs).

Figure 3:
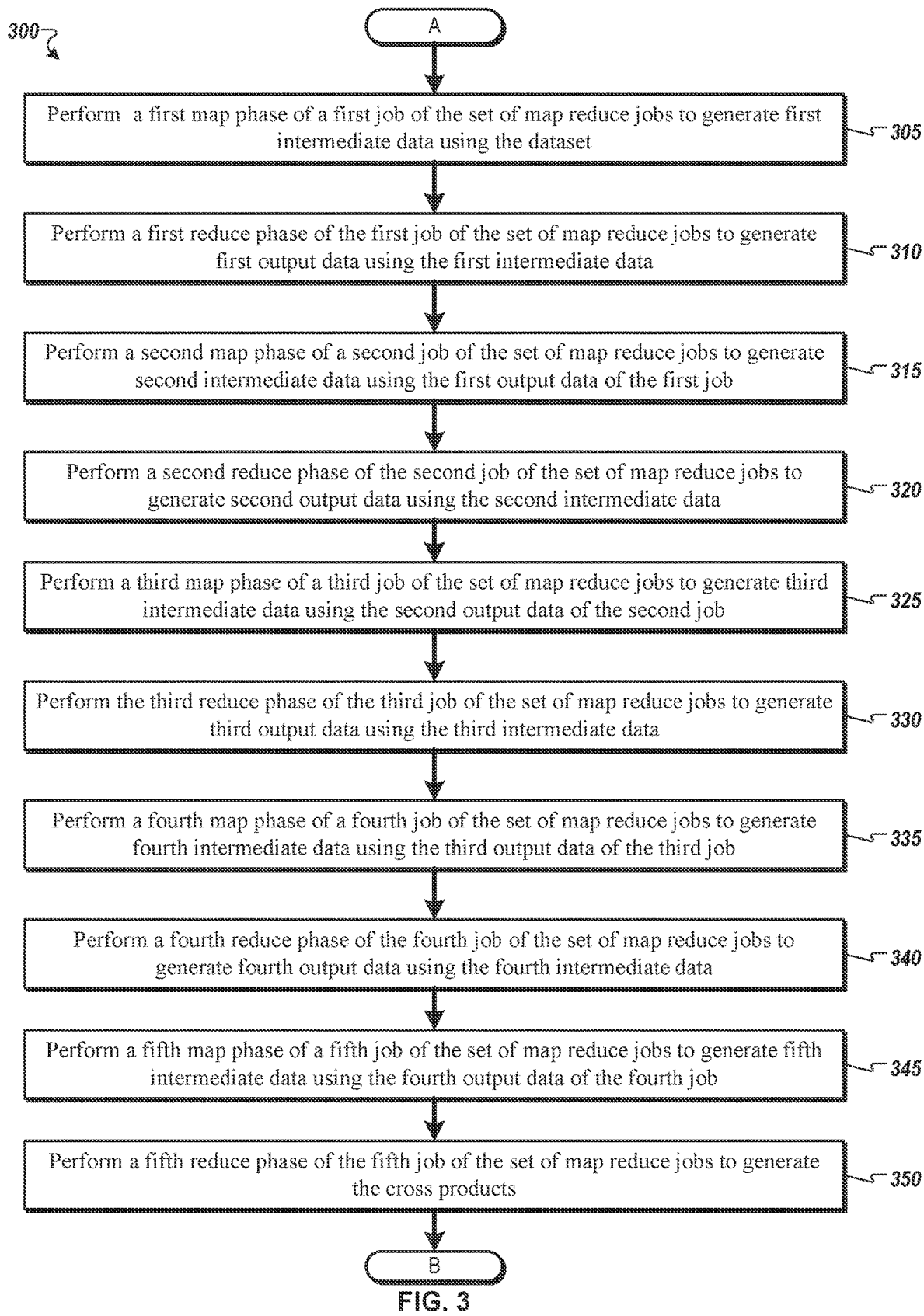
FIG. 3 is a flow diagram that illustrates a method for performing a set of map reduce jobs on the dataset to generate cross products, in accordance with embodiments of the disclosure.

FIG. 3 is a flow diagram that illustrates method 300 for performing a set of map reduce jobs on the dataset to generate cross products, in accordance with embodiments of the disclosure. Method 300 may be performed by processing logic that includes hardware (e.g., circuitry, dedicated logic, programmable logic, microcode), software (e.g., instructions run on a processing device to perform hardware simulation), or a combination thereof. In some embodiments, cross product module 140 executing at computer cluster 150 (e.g., at one or more of node 132 or nodes 134) may perform some or all the operations. In other embodiments, cross product module 140 executing at collaboration platform 120, client device 110A, client device 110B, or server 130 or combination thereof may perform some or all the operations. It may be noted that the in some embodiments, method 300 may include the same, different, fewer, or a greater number of operations performed in any order.

At operation 305, processing logic performing method 300 performs a first map phase of a first job of the set of map reduce jobs to generate first intermediate data using the dataset. The first intermediate data includes the groups of key-value pairs. The key-value pairs of a particular group of key-value pairs have identical keys. The key-value pairs between different groups of key-value pairs have non-identical keys.

At operation 310, processing logic performs a first reduce phase of the first job of the set of map reduce jobs to generate first output data using the first intermediate data. The first output data includes a first group of the groups of key-value pairs with first modified keys that indicate a sorting order and a number of key-value pairs in the first group of key-value pairs. The first job of the set of jobs is further described with respect to FIG. 4A.

In some embodiments, dataset can have entries that include ranges of time. In embodiments, where the dataset has entries that include ranges of time, to perform the first map phase of the first job of the set of map reduce jobs to generate first intermediate data using the dataset, processing logic identifies a parameter associated with the request to perform a set of map reduce jobs that generate the plurality of cross products. In some embodiments, the parameter indicates a unit of time. For each entry of the dataset, processing logic identifies a range of time indicated in the entry. Processing logic increments the range of time by the unit of time. The incrementing starts from an earliest time identified by the range of time to a last time identified by range of time. At each increment, processing logic generates a timestamp that reflects a time in the time range at the increment. Processing logic generates one or more key-value pairs for the entry based on the incrementing. A key of the one or more key-value pairs identifies the timestamp of the increment, and a value of the one or more key-value pairs identifies data of the entry. Processing logic generates the groups of key-value pairs, where each key-value pair of a respective group of key-value pairs includes an identical timestamp (e.g., identical key). The above mapping operation is further described with respect to FIG. 4F.

At operation 315, processing logic performs a second map phase of a second job of the set of map reduce jobs to generate second intermediate data using the first output data of the first job. The second intermediate data includes the first group of key-value pairs that have the first modified keys. It can be noted that the operation 315 and the following operations 320-350 are described for the first group of key-value pairs to produce a cross product for the first group of key-value pairs, for the sake of clarity. It can be appreciated that similar operations can be performed on other groups of key-value pairs, where a cross product is generated for each of the groups of key-value pairs. In total, multiple cross products are generated for the dataset each based on a particular value (e.g., joined on a particular key).

At operation 320, processing logic performs a second reduce phase of the second job of the set of map reduce jobs to generate second output data using the second intermediate data. The second output data includes first subgroups of the first group of key-value pairs with second modified keys. The first modified keys of the first group of key-value pairs are modified to generate second modified keys that identify the first subgroups of the first group of key-value pairs.

In some embodiments, to perform the second reduce phase of the second job of the set of map reduce jobs to generate second output data using the second intermediate data, processing logic sorts key-value pairs of the first group of key-value pairs in the sorting order identified by the first modified keys. Processing logic identifies a number of key-value pairs in the first group of key-value pairs indicated by an initial key of the sorted key-value pairs. Processing logic determines a number of key-value pairs for each of the subgroups of key-value pairs (associated with first group of key-value pairs). The number of key-value pairs in the first subgroups does not exceed a maximum number of key-value pairs identified in the request. Processing logic generates the second modified keys for the first subgroups of key-value such that the second modified keys identify a particular subgroup from first subgroups. The second map reduce job of the set of map reduce jobs is further described with respect to FIG. 4B.

At operation 325, processing logic performs a third map phase of a third job of the set of map reduce jobs to generate third intermediate data using the second output data of the second job. The third intermediate data includes the first subgroups of key-value pairs.

At operation 330, processing logic performs the third reduce phase of the third job of the set of map reduce jobs to generate third output data using the third intermediate data. The third output data includes second subgroups of key-value pairs generated from the first subgroups of key-value pairs. The second subgroups of key-value pairs include the first subgroups of key-value pairs and duplicate key-value pairs of the first subgroups of key-value pair, where at least the keys of the of the duplicated key-value pairs are modified. The third map reduce job of the set of map reduce jobs is further described with respect to FIG. 4C.

At operation 335, processing logic performing a fourth map phase of a fourth job of the set of map reduce jobs to generate fourth intermediate data using the third output data of the third job. The fourth intermediate data includes the second subgroups of key-value pairs.

At operation 340, processing logic performs a fourth reduce phase of the fourth job of the set of map reduce jobs to generate fourth output data using the fourth intermediate data. Each reducer of the fourth reduce phase receives respective key-value pairs of the fourth intermediate data that have identical keys. At each reducer each value of the respective key-values pairs is paired with every remaining value of the respective key-values pairs to generate new values with new keys (e.g., cross product). The fourth output data includes the new key-value pairs from each of the reducers of the fourth job. The fourth map reduce job of the set of map reduce jobs is further described with respect to FIG. 4D.

At operation 345, processing logic performs a fifth map phase of a fifth job of the set of map reduce jobs to generate fifth intermediate data using the fourth output data of the fourth job. The fifth intermediate data includes the new key-value pairs from each of the reducers of the fourth job.

At operation 350, processing logic performs a fifth reduce phase of the fifth job of the set of map reduce jobs to perform a deduplication operation to remove duplicate key-value pairs from the new key-value pairs from each of the reducers of the fourth job and to provide the cross product of the plurality of cross products for the first group of key-value pairs. As noted above, similar operations 315-350 can be performed on the first group of key-value pairs and other groups of key-value pairs (produced at the first job) to produce multiple cross products for the dataset. Each of the cross products is a cross product on a subset (e.g., non-overlapping subset) of the original dataset.

Figure 4A:
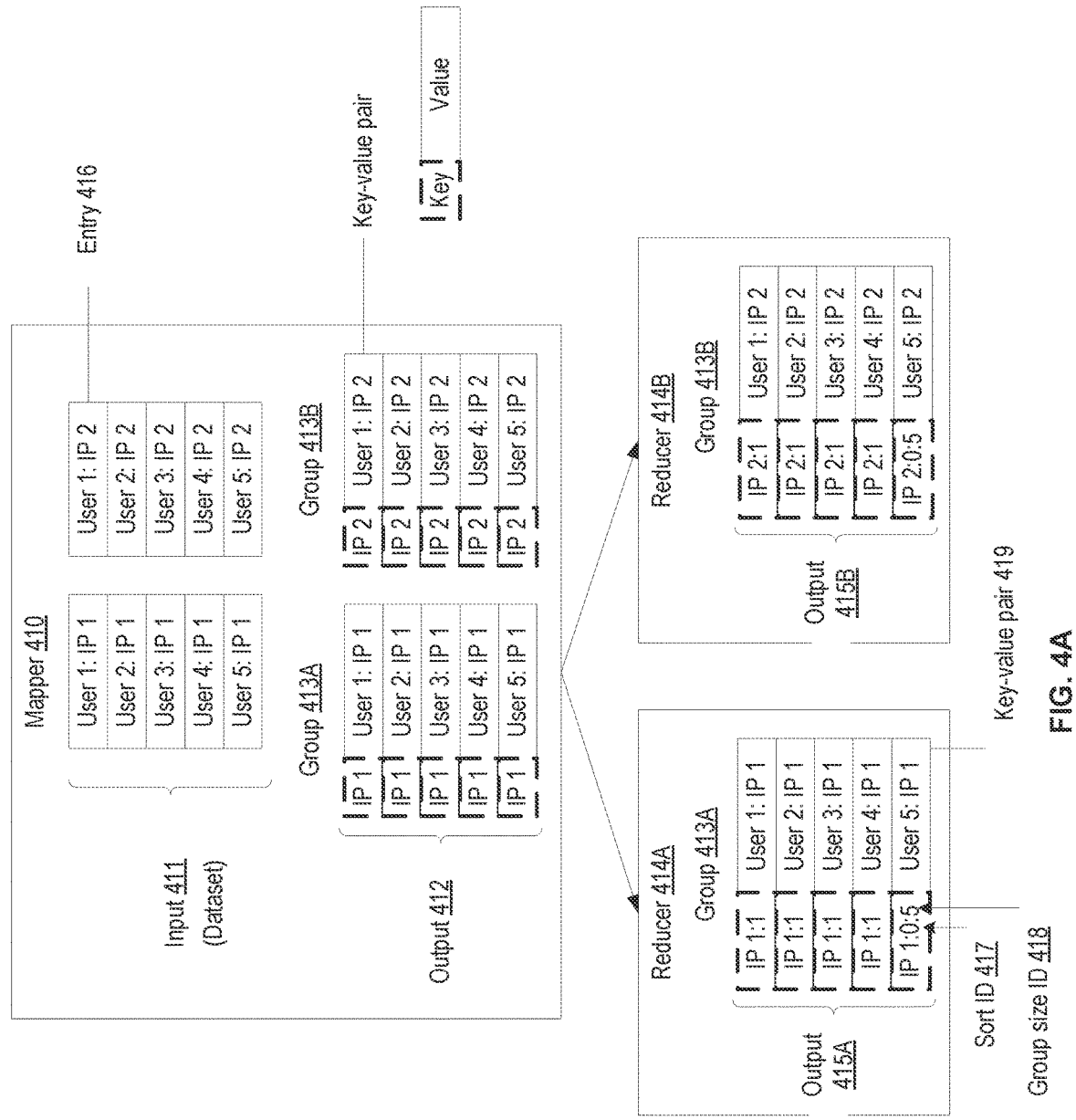
FIG. 4A illustrates a diagram of a first job of the set of map reduce jobs to generate cross products from a dataset based on a join field, in accordance with embodiments of the disclosure.

FIG. 4A illustrates a diagram of a first job of the set of map reduce jobs to generate cross products from a dataset based on a join field, in accordance with embodiments of the disclosure. First map reduce job 400 illustrates mapper 410 and reducer 414A and reducer 414B (generally referred to as "reducer(s) 414"). A request is received to perform a set of map reduce jobs that generate cross products from a dataset based on join field. In the illustrated example, input 411 is received by mapper 410. The input 411 can include the dataset on which to perform the set of map reduce jobs. As illustrated, the dataset includes 10 entries, and each entry includes data. For example, entry 416 includes the data "User1: IP 2." The join field can be included as a parameter of the request to perform a set of map reduce that generate cross products from the dataset. In the current example, the join field is "IP," (e.g., internet protocol address) which indicates that the cross product is to be generated for a subset of the dataset that each has a particular value. For example, all the entries with "IP1" are includes in a subset for which a cross product is to be generated, and all the entries with "IP2" are included in another subset for which another cross product is to be generated. The cross products between entries that include "IP1" and entries that include "IP2" are not generated.

In embodiments, the mapper 410 performs a map task using the dataset (e.g., input 411) and generates multiple groups of key-value pairs. For example, mapper 410 uses the data within each entry to identify a key based on the join field "IP." Mapper 410 identifies a first subset of entries of the dataset that include "IP1" and generates a group of key-value pairs 413A based on the first subset of entries. Mapper 410 identifies a second subset of entries of the dataset that include "IP2" and generates a group of key-value pairs 413B based on the second subset of entries.

It can be noted that in some embodiments, the dataset can includes any number of entries. For example, the dataset can include millions of entries. Thousands of groups of key-value pairs can be generated from the dataset, where each group of key-value pairs is based on an identical key. Each group of key-value pairs can in turn have thousands to millions of key-value pairs all having identical keys. It can also be noted that in FIG. 4A-4F each map phase of a corresponding map job can use one or more mappers, and each reduce phase of a corresponding reduce job can use one or more reducers.

As noted above, an entry of a dataset can be converted to a key-value pair using one or more mapping operations of a map task. In some embodiments, some data of entry is used as the key (e.g., "IP1" or "IP2"), and the entire data of the entry is kept and becomes the value in the key-value pair. The join field (e.g., "IP") indicates which data of the entry is to become the key (e.g. key data). If the key data (e.g., "IP1" or "IP2") in multiple entries is identical, those entries will generate key-value pairs for a group of key-value pairs (e.g., group of key-value pairs 413A or group of key-value pairs 413B).

The output 412 (e.g., first intermediate data) of mapper 410 includes group of key-value pairs 413A and group of key-value pairs 413B. The output 412 is used as input (not shown) to the reduce phase of the first map reduce job 400. The key-value pairs of each group are sent to different reducers 414A and 414B in accordance with the key, such that key-value pairs of group 413A with identical keys ("IP1") are sent to reducer 414A and key-value pairs of group 413B with identical keys ("IP2") are sent to reducer 414B. In embodiments, key-value pairs with identical keys are sent to a particular reducer.

At the reduce phase, reducers 414 receive output 412 from mapper 410. Reducers 414 modify the output 412 such that the keys of the group of key-value pairs 413A and 413B are modified (e.g., first modified keys) to influence how the output 415A and output 415B sorted and re-grouped (e.g., creation of subgroups) at the next reduce phase of the second map job 420.

For example, the group of key-value pairs 413A is passed to reducer 414A. The reducer 414A performs a reduce task that counts the total number of key-value pairs in the group of key-value pairs 413A. One of the key-value pairs of the group of key-value pairs 413A is modified with a sort ID 417 so that at the next reduce phase of the second map job 420 the group of key-value pairs 413A is sorted such that the location of key-value pair with the sort ID 417 is known in the sorting order.

In the current example, the sort ID 417 includes a value that will allow the selected key-value pair of the group of key-value pairs 413A to be the first or initial key-value pair after a sorting operation. In the current example, the key "IP1" of the last key-value pair 419 of the group of key-value pairs 413A is modified with ("0") to identify that key-value pair 419 is to be the first key-value pair in a sorting order. The other key-value pairs of the group of key-value pairs 413A are modified with other sort IDs. The other sort IDs of the other key-value pairs are a number greater than sort ID 417 ("0") to identify that the other key-value pairs are sorted after the last key-value pair 419 in the sorting order. The other keys of the other key-value pairs are modified with "1" that indicates that they are to be sorted after key-value pair 419. It can be noted that key-value pair 419 can contain additional information (e.g., group size ID 418) that can be used by the next reduce phase of the second map job 420. Knowing the location of key-value pair 419 (placement in the sorting order) allows the next reduce phase of the second map job 420 to know where to look to extract the information (e.g., group size ID 418) from the modified key of key-value pair 419.

In embodiments, reducer 414A counts the number of key-value pairs in the group of key-value pairs 413A. The key of key-value pair 419 is further modified (e.g., group size ID 418) to indicate the number of key-value pairs in the group of key-value pairs 413A. In the example, there are 5 key-value pairs and the key of key-value pair 419 is further modified with "5" to indicate the number of key-value pairs in the group of key-value pairs 413A.

It can be noted that the modified keys of the group of key-value pairs 413A are also referred to as the first modified keys. The first modified keys indicate a sorting order and a number of key-value pairs in the group of key-value pairs 413A. It can be further noted that similar operations can be performed for group of key-value pairs 413B. For the sake of clarity, the subsequently described map reduce jobs described with respect to FIG. 4B-4F describe map and reduce tasks performed on group of key-value pairs 413A. It can be appreciated that similar map and reduce tasks can be performed on group of key-value pairs 413B, even if not explicitly recited.

Figure 4B:
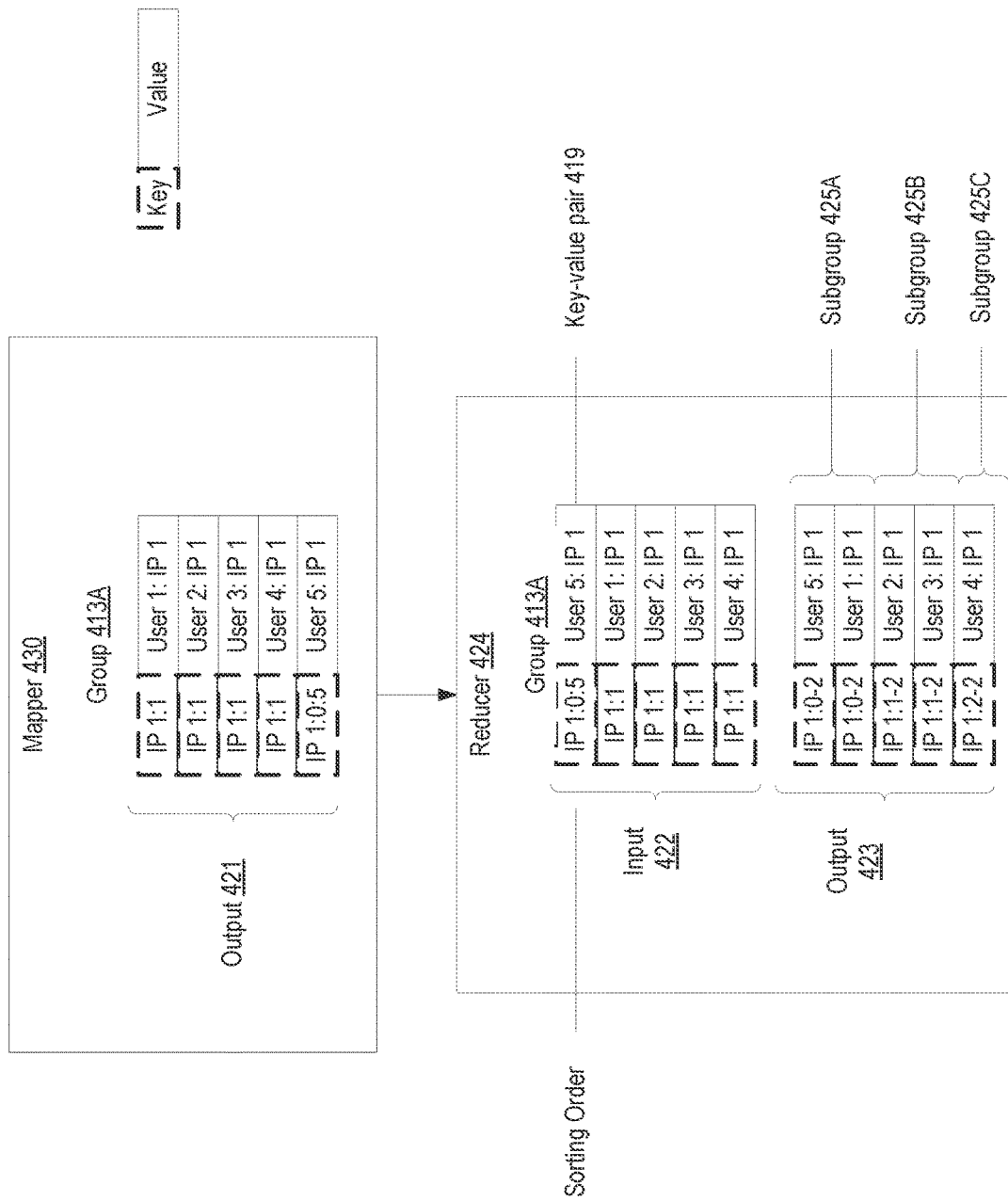
FIG. 4B illustrates a diagram a second job of the set of map reduce jobs to generate cross products from a dataset based on a join field, in accordance with embodiments of the disclosure.

FIG. 4B illustrates a diagram of a second job of the set of map reduce jobs to generate cross products from a dataset based on a join field, in accordance with embodiments of the disclosure. Second map reduce job 420 illustrates mapper 430 and reducer 424. Second map reduce job 420 divides the group of key-value pairs 413A into subgroups so that processing in subsequent map reduce jobs of the set of map reduce jobs is more efficient. The second map reduce job 420 creates subgroups of the group of key-value pairs 413A having a size no greater than a maximum number of key-value pairs.

Mapper 430 receives the output 415A of reducer 414A of the first map reduce job 400 of the set of map reduce jobs. The output 415A includes the first group of key-value pairs 413A that have the first modified keys. Output 415A from the reducer 414A of the first map reduce job 400 is used as input for mapper 430. Mapper 430 uses the input and generates second intermediate data, such as output 421. In this example, mapper 430 does not modify the group of key-value pairs 413A, but reads and passes group of key-value pairs 413A to a reducer 424. The output 421 of mapper 430 is used as input 422 to reducer 424. Logic can be implemented such that all the key-value pairs with the same prefix (e.g., "IP1") that includes the information in the key before the colon are sent to a same reducer.

In embodiments, reducer 424 performs the reduce phase of the second map reduce job 420 to generated output 423 using the intermediate data (e.g., output 421) from mapper 430. Reducer 424 modifies the first modified keys of the group of key-value pairs 413A to generate second modified keys that identify the subgroups (e.g., subgroup 425A, 425B, and 425C) of the group of key-value pairs 413A.

In embodiments, reducer 424 sorts the group of key-value pairs 413A in a sorting order using the first modified keys, and in particular the sorting IDs. Sorting ID 417 represented by a "0" after the first colon in the key of the key-value pair 419 of the group of key-value pairs 413A it sorted to be the initial key of the sorting order. The remaining key-value pairs of the group of key-value pairs 413A have larger sorting IDs and are ordered after key-value pair 419.

In embodiments, reducer 424 identifies a number of key-value pairs in the group of key-value pairs 413A that is indicated by the key of the initial key-value pair, key-value pair 419. For example, the reducer 424 knows which position in the sorting order contains the key-value pair having a key with the group size ID 418, in this instance the initial position. Reducer 414A parses the key of the initial key-value pair (e.g., key-value pair 419) to identify the group size ID 418 (e.g., "5") which identifies the number of key-value pairs in the group of key-value pairs 413A.

In embodiments, reducer 424 determines the number of key-value pairs that each of the subgroups 425A, 425B, and 425C (generally referred to as "subgroup(s) 425"). Subgroups 425 are non-overlapping subgroups of group of key-value pairs 413A. In embodiments, a parameter (e.g., maximum number parameter) indicates the maximum number of key-value pairs that each of the subgroups 425 are to include, such the number of key-value pairs in any of the subgroups 425 does not exceed a maximum number of key-value pairs identified by the maximum number parameter. In some embodiments, the initial request to perform a set of map reduce operations that generate the cross products includes the maximum number parameter. In other embodiments, the maximum number parameter can be predetermined and part of the script or source code of the set of map reduce jobs. In the current example, the maximum number parameter indicates that the maximum number of key-value pair in a subgroup 425 cannot exceed two key-value pairs.

In embodiments, reducer 424 generates the second modified keys for the subgroups of key-value pairs (e.g., subgroups 425) such that the second modified keys identify a particular subgroup from subgroups 425 and that a particular subgroup does not exceed the maximum number of key-value pairs. For example, subgroup 425A includes the maximum number of key-value pairs (e.g., two key-value pairs). The keys of subgroup 425A are modified after the colon to read "0-2," which represents that the key-value pairs of subgroup 425A belong to subgroup "0" of three subgroups. Similarly, the keys of subgroup 425B are modified after the colon to read "1-2," which represents that the key-value pairs of subgroup 425B belong to subgroup "1" of three subgroups. Key of subgroup 425C are modified after the colon to read "2-2," which represents that the key-value pair of subgroup 425C belongs to subgroup "2" of the three subgroups. It can be noted that subgroup 425C includes only one key-value pair, because no additional key-value pairs are available to fill the subgroup.

Figure 4C:
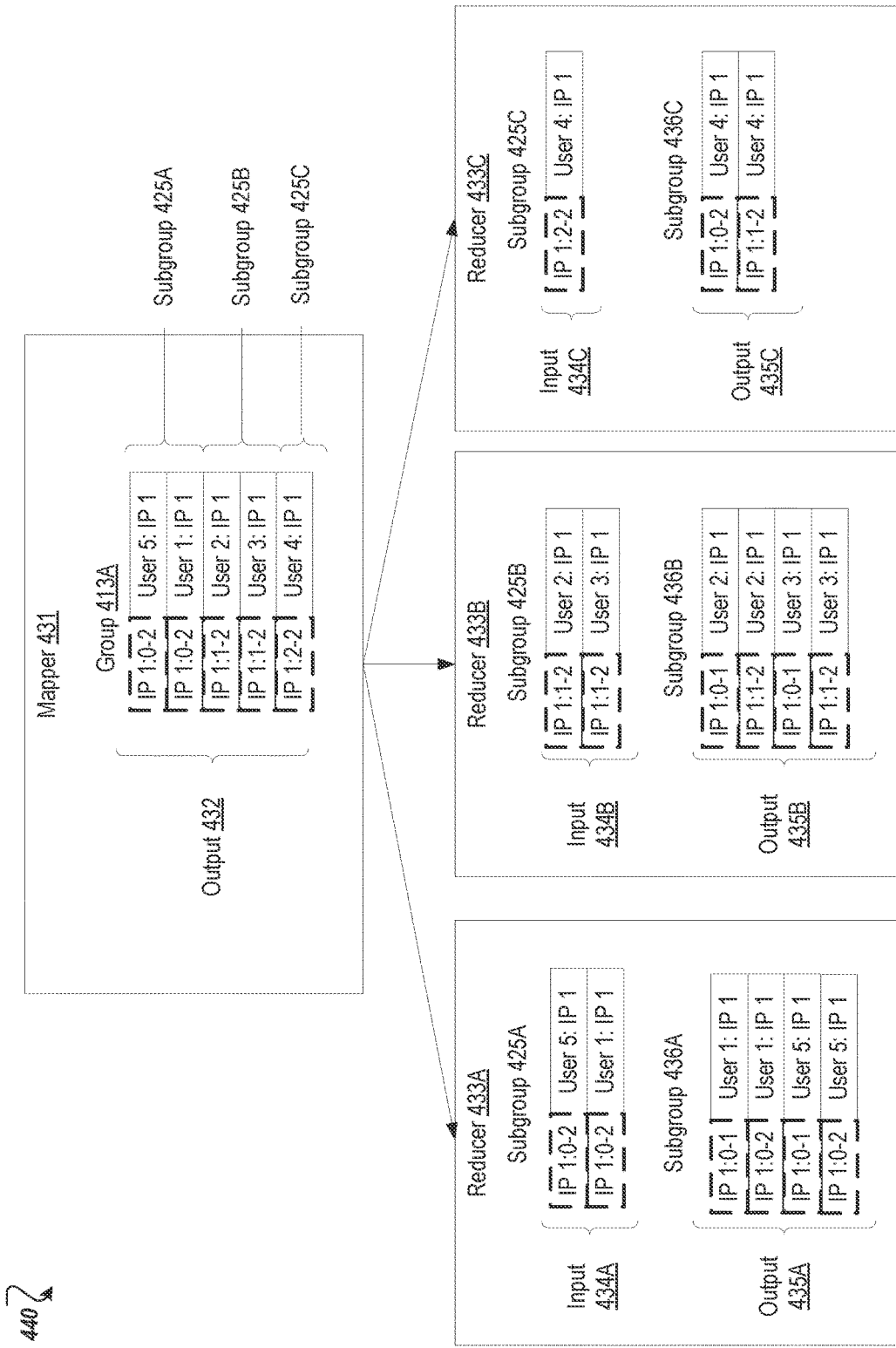
FIG. 4C illustrates a diagram of a third job of the set of map reduce jobs to generate cross products from a dataset based on a join field, in accordance with embodiments of the disclosure.

FIG. 4C illustrates a diagram of a third job of the set of map reduce jobs to generate cross products from a dataset based on a join field, in accordance with embodiments of the disclosure. Third map reduce job 440 illustrates mapper 431 and reducers 433A, 433B, and 433C (generally referred to as "reducer(s) 433). Third map reduce job 440 makes duplicate copies of the key-value pairs of the subgroups 425 and combines the copies of the key-value pairs with the key-value pairs of the respective subgroups 425. In some instance, the keys of the copied key-value pairs are modified. Duplicating key-value pairs of the subgroups 425 and modifying the keys of at least the copied key-value pairs is performed so that key-value pairs with the same values (but different keys) are sent to different reducers in the fourth map reduce job 450. Forth map reduce job 450 will generate a cross product for a group of key-value pairs (e.g., group of key-value pair 413A). By duplicating key-value pair of the subgroups 425 and modifying the key of at least the copied key-value pairs at the third map reduce job 440, the processing load is spread more evenly across reducers of fourth map reduce job 450 and enables each value of group of key-value pairs 413A to be paired with each remaining value of group of key-value pairs 413A even though the operation is spread across multiple reducers. Each of the reducers at the fourth map reduce job 450 can receive a predetermined maximum number of key-value pairs (based at least in part on the earlier generation of subgroups 425 at map reduce job 420 to include no more than a maximum number of key-value pairs).

In embodiments, to perform the map phase of the third map reduce job 440, mapper 431 receives the output 423 from reducer 424 of the second map reduce job 420. The output 423 becomes the input of mapper 431, and includes subgroups 425 of group of key-value pairs 413A. In the particular example, mapper 431 does not modify the subgroups 425 of group of key-value pairs 413A. The subgroups 425 become the intermediate data (e.g., output 432). The intermediate data is read and passed to the reducers 433, such that each subgroup 425A, 425B, and 425C is passed to a different reducer 433A, 433B, and 433C, respectively, based on the subgroups keys. In embodiments, key-value pairs with the same key are passed to the same reducer.

In embodiments, at the reduce phase of the third map reduce job 440, the reducers 433A, 433B, and 433C respectively receive subgroup 425A, 425B, and 425C. Subgroup 425A, 425B, and 425C are used as input 434A, 434B, and 434C by the respective reducers 433. The reducers 433A, 433B, and 433C generate output 435A, 435B, and 435C, respectively. The output 435A, 435B, and 435C of reducers 433 includes second subgroups of key-value pairs 436A, 436B, and 436C, respectively. The subgroups 436A, 436B, and 436C are generated from first subgroups 425A, 425B, and 425C. The subgroups 436A, 436B, and 436C include the key-value pair from the respective subgroups 425A, 425B, and 425C and duplicate key-value pairs for the respective subgroups 425A, 425B, and 425C. The keys of at least the duplicate key-value pairs are modified.

For example, reducer 433A receives input 434A from mapper 431. Input 434A includes the key-value pairs from subgroup 425A. Reducer 433A passes the key-value pairs from the subgroup 425A to the output 435A (e.g., the $2^{nd}$ and $4^{th}$ key-value pair of subgroup 436A). Reducer 433A also duplicates the key-value pairs of subgroup 425A and modifies the keys of the duplicated key-value pairs (e.g., the $1^{st}$ and the $3^{rd}$ key-value pair of subgroup 436A).

In another example, reducer 433C receives input 434C from mapper 431. Input 434C includes the key-value pair from subgroup 425C. Reducer 433C passes the key-value pair from the subgroup 425C to the output 435C, duplicates the key-value pair of subgroup 425C and modifies the keys of both the duplicated key-value pair and the passed key-value pair from the subgroup 425C.

It can be noted that reducers 433 modify the keys to include reducer IDs. The reducer IDs can be used such that keys with the same reducer IDs are sent to the same reducer in the subsequent map reduce job (e.g., fourth map reduce job 450). The reducer IDs are shown after the colon of the keys. For example, in subgroup 436A, the first key-value pair shows reducer ID "0-1," the second key-value pair shows reducer ID "0-2," and the third key-value pair shows reducer ID "0-1." In some embodiments, the generation of keys for subgroups 436 is optimized to reduce the number of duplicate cross product records that are generated at the fourth map reduce job 450, while guaranteeing that every value of a group of key-value pairs 413A is paired with every remaining value of group of key-value pairs 413.

In one example, key optimization can be illustrated at reducer 433A. The input 434A includes the subgroup 425A. The information in keys of subgroup 425A after the colon (i.e., "0-2") indicates subgroup ID and number of subgroups ID. For subgroup 425A, the subgroup ID is "0" and number of subgroups ID is "2" (where the total number of groups is 3—groups "0", "1", and "2"). The reducer 443A will iterate subgroup ID over all the possible subgroup IDs. For example, reducer 433A will produce subgroup ID-number of subgroups ID as follows "0-0," "0-1," "0-2." If an iteration of subgroup ID-number of subgroups ID does not repeat numbers (e.g., "0-1," "0-2"), the resulting subgroup ID-number of subgroups ID is used as part of the key for subgroup 436A. If an iteration of subgroup ID-number of subgroups ID does repeat numbers (e.g., "0-0"), the resulting subgroup ID-number of subgroups ID is not used as part of the key for subgroup 436A.

Figure 4D:
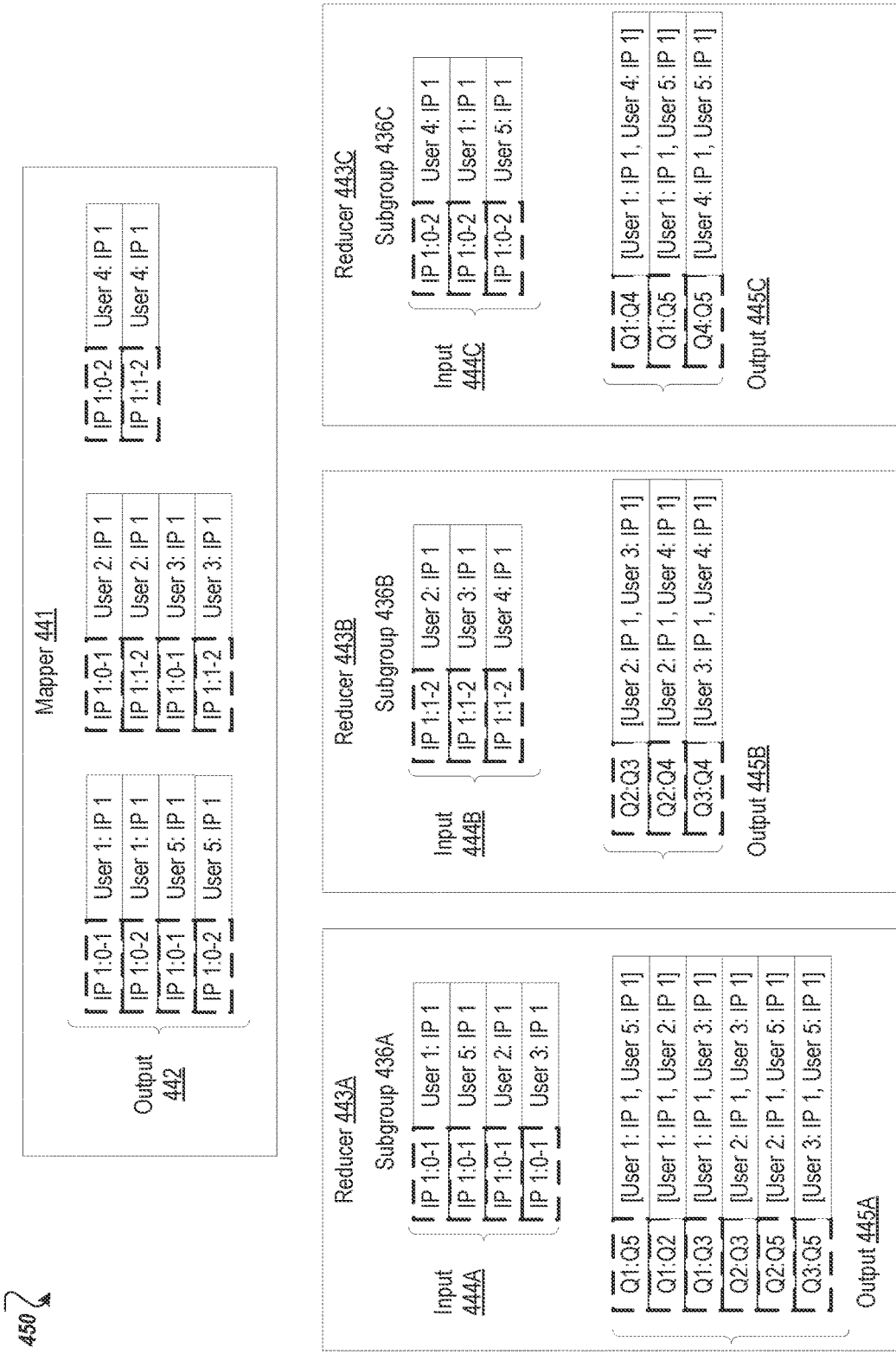
FIG. 4D illustrates a diagram of a fourth job of the set of map reduce jobs to generate cross products from a dataset based on a join field, in accordance with embodiments of the disclosure.

FIG. 4D illustrates a diagram of a fourth job of the set of map reduce jobs to generate cross products from a dataset based on a join field, in accordance with embodiments of the disclosure. Fourth map reduce job 450 illustrates mapper 441 and reducers 443A, 443B, and 443C (generally referred to as "reducer(s) 443"). At fourth map reduce job 450, each reducer 443 generates pairs of values (e.g., cross product pairs) such that each value of a key-value pair is paired with every remaining value of the remaining key-value pairs at a particular reducer 443. In embodiments, the fourth map reduce job 450 effectively generates the cross product for the group of key-value pair 413A. In embodiments, the output of the reduce phase of the fourth map reduce job 450 can include duplicate key-value pairs (e.g., cross product pairs) that can be deduplicated at the fifth map reduce job 460. The output 445A, 445B, and 445C (generally referred to as "output(s) 445") of respective reducers 443 include new key-value pairs whose values included paired values (e.g., cross product pairs).

In embodiments, outputs 435 of the third map reduce job 440 that include subgroups 436 of the group of key-value pairs 413A is sent to mapper 441 of the fourth map reduce job 450 to be used as inputs to the mapper 441. At the map phase of the fourth map reduce job 450, the mapper 441 generates intermediate data using the output 435 of the third map reduce job 440. The intermediate data includes the subgroups 436 (e.g., second subgroups of key-value pairs). Mapper 441 reads the input (e.g., subgroups 436 of key-value pairs) and sends each of the subgroups 436 of the key-value pairs to a respective one of the reducers 443. In embodiments, key-value pairs with identical keys are sent to the same reducer, such that subgroup 436A is sent to reducer 443A, subgroup 436B is sent to reducer 443B, and subgroup 436C is sent to reducer 443C. Subgroups 436A, 436B, and 436C are respectively used as input 444A, 444B, and 444C at the respective reducers 443.

In embodiments, reducers 443 perform the reduce phase of the fourth map reduce job 450 to generated output 445A, output 445B, and output 445C (generally referred to as "output 445"), respectively. At respective reducers 443, every value of a respective key-value pairs of the subgroup 436 is paired with every remaining value of the respective key-value pairs of the subgroup 436 to generated new values with new keys (e.g., new key-value pairs that are cross product pairs).

For example, reducer 443C receives input 444C that includes subgroup 436C, which all share the same key "IP 1:0-2." The values of the subgroup 436C are all different. The reducer 443C creates new key-value pairs as shown at output 445C, where every value of the subgroup 436C is paired with every other value of the subgroup 436C. As illustrated the key-value pairs of the output 445C include "[User 1: IP 1], [User 4: IP 1]," "[User 1: IP 1, User 5: IP 1]," and "[User 4: IP 1, User 5: IP 1]."

In some embodiments, the new keys of new key-value pairs illustrated at output 445 use unique IDs that are associated with the entry(ies) of the dataset from which the values of the new key-value pairs originated (e.g., were derived). For example, the first key-value pair at output 445A of reducer 443A includes a key "Q1:Q5." "Q1" represents the unique ID associated the first entry of the dataset (e.g., input 411 of FIG. 4A) from which the value "User 1: IP1" was derived and "Q5" represents the unique ID associated with the fifth entry of the dataset from which the value "User 5: IP1" was derived. Tying the values of the new key-value pairs at output 445 to their entries in the original dataset using unique IDs helps in deduplication of data (e.g., removing redundant data). For instance, there can be situations where the values of different key-value pairs (e.g., cross product pairs of the new key-value pairs at output 445) are identical but originate or were derived from different entries of the dataset. In such cases, an administrator or other user may want to keep the duplicate values that originate from different entries.

In some embodiments, the unique ID identifying the particular entry of the dataset from which the value of the key-value pair was obtained can be associated with the value through the set of map reduce jobs. For example, the unique ID associated with a value can be inserted into the entry of the dataset, such that the unique ID becomes part of the value of the key-value pair at the first map reduce job 400 and effectively travels the value over numerous map reduce jobs, as described herein. At fourth map reduce job 450, the unique ID can be retrieved from the respective value of a key-value pair and used as part of the new key. In some instances, the unique ID can be removed from the value during the reduce phase of the fourth map reduce job 450.

In some embodiments, a physical node can execute multiple reducers. A memory unit (e.g., cache) can be established by the map-reduce framework such that each physical node has access some amount of memory of the memory unit to store data. In some embodiments, the memory unit associated with a physical node can be configured to store keys (or key-value pairs) created by reducers associated with the particular physical node. The memory unit can be used for deduplication, such that that before writing a new key-value pair to the output of a reducer, the cache can be checked to see if the key already exists. If the key exists in the memory unit, the key-value pair is not written to the output of the reducer. If the key does not exist in the memory unit, the key-value pair is written to the output of the reducer.

Figure 4E:
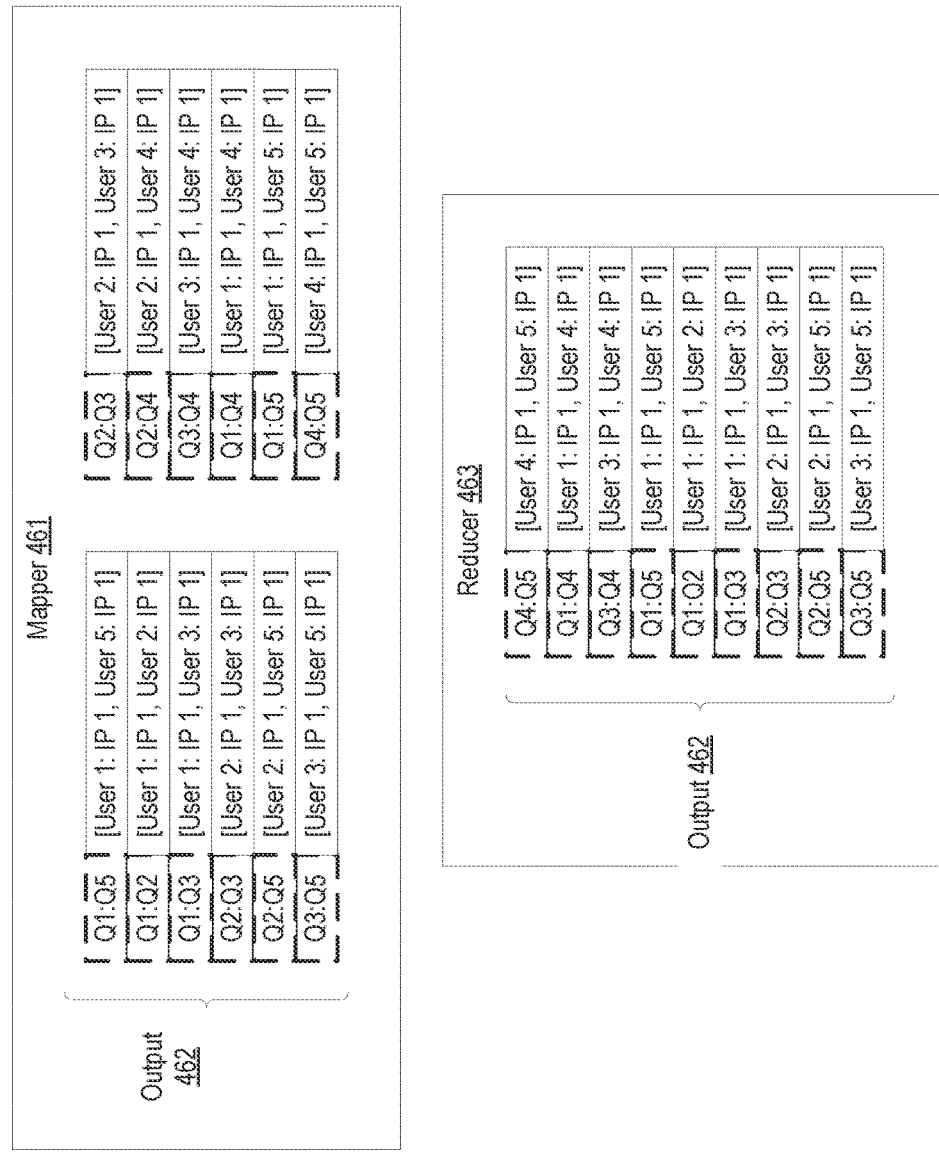
FIG. 4E illustrates a diagram of a fifth job of the set of map reduce jobs to generate cross products from a dataset based on a join field, in accordance with embodiments of the disclosure.

FIG. 4E illustrates a diagram of a fifth job of the set of map reduce jobs to generate cross products from a dataset based on a join field, in accordance with embodiments of the disclosure. Fifth map reduce job 460 illustrates mapper 461 and reducer 463. At fifth map reduce job 460, duplicate key-value pairs are removed (e.g., deduplication) and the cross product (without duplicate key-value pairs) for the group of key-value pairs 413A is stored at a datastore.

In embodiments, at the map phase of the fifth map reduce job 460, mapper 461 receives the output 445 of reducers 443 of the fourth map reduce job 450. The output 445 is used as input to mapper 461. Mapper uses the input to generate intermediate data. The intermediate data includes the new key-value pair produced by the reducers 443 of the fourth map reduce job 450. Mapper 461 reads the data and passed the data, without alteration, to reducer 463.

In embodiments, a reduce phase of the fifth map reduce job 460 is performed by reducer 463. The reduce phase performs a deduplication operation to remove duplicate key-value pairs from the new key-value pairs. Output 462 provides the cross product for the subset of the dataset (all entries that have "IP1") from which group of key-value pairs 413A is derived. The output 462 is stored at a datastore. It can be noted that a single reducer 463 is shown for purposes of clarity, rather than limitation. In some embodiments, each key-value pair in the output 462 of mapper 461 that has an identical key is sent to a particular reducer. For example, key-value pairs with the key "Q1:Q5" are sent to a first reducer, and key-value pairs with the key "Q2:Q3" are sent to a second reducer. Each reducer can perform deduplication on the received key-value pairs.

It can also be noted that the set of jobs described herein includes the first map reduce job 400, the second map reduce job 420, the third map reduce job 440, the fourth map reduce job 450, and the fifth map reduce job 460. In other embodiments, one or more of the map reduce jobs can be modified. For example, FIG. 4F describes an alternative mapping phase that can be implemented in the first map reduce job 400. In another example, a cache can be used with respect to the map reduce job 450 that helps perform a deduplication operation. In some embodiments, one or more operations of the map reduce jobs of the set of map reduce jobs can be combined. For example, operations of map reduce job 420 and map reduce job 440 can be combined into a single map reduce job. In some embodiments, not all the map reduce jobs of the set of map reduce jobs are performed. For example, in some implementations map reduce job 460 can be replaced by the cache-based deduplication operation described with respect to map reduce job 450.

Figure 4F:
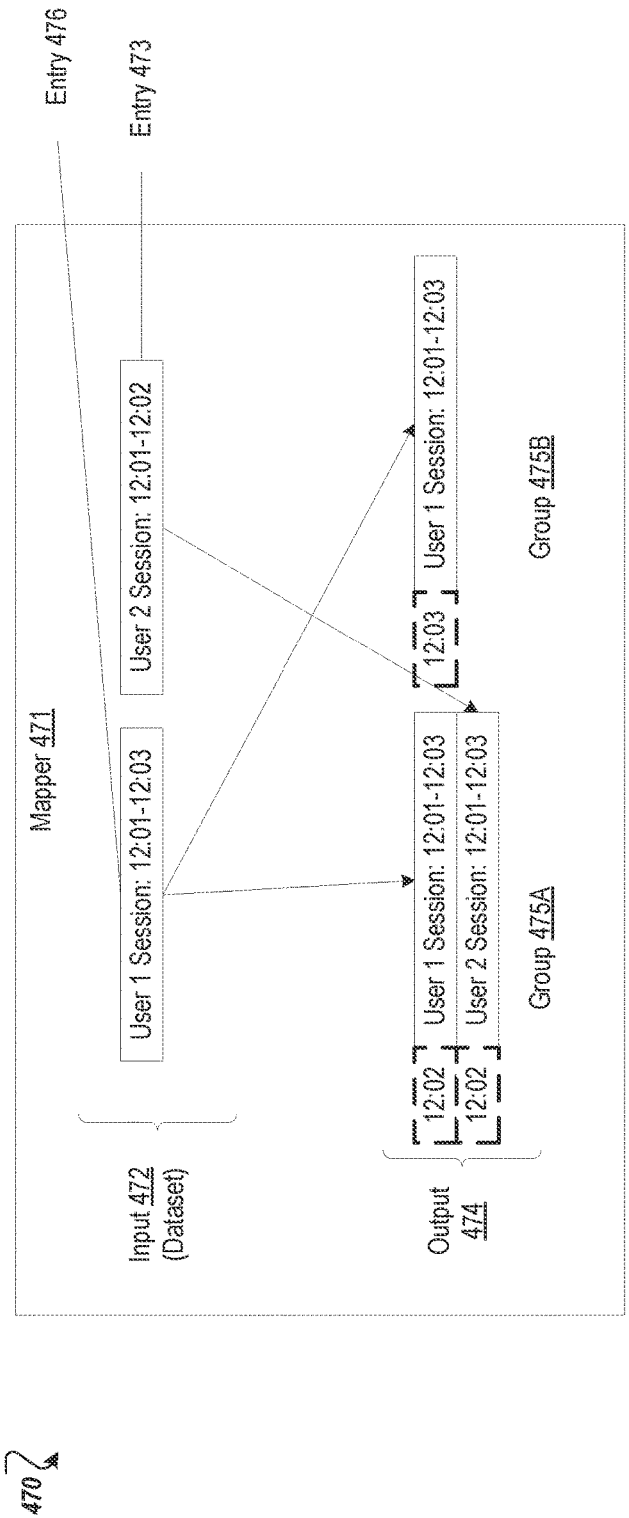
FIG. 4F illustrates a diagram of a map phase of the first job of the set of map reduce jobs to generate cross products from a dataset that includes time ranges, in accordance with embodiments of the disclosure.

FIG. 4F illustrates a diagram of a map phase of the first job of the set of map reduce jobs to generate cross products from a dataset that includes time ranges, in accordance with embodiments of the disclosure. In embodiments, map phase 470 can be used as an alternative to the map phase illustrated in the first map reduce job 400 of FIG. 4A. In some embodiments, the entries of a dataset on which cross products are to be generated can include a time data type, such as a time range. For example, entry 473 of the dataset (e.g., input 472) includes the time range "12:01-12:02." It some instances, it can be beneficial to generate cross products of data to understand if the data overlaps in time. For example, the collaboration platform 120 can determine if multiple user are playing a game at the same time. The map phase 470 can create a key-value pair for different times (e.g., 12:02, 12:03) in the time range. In embodiments, the map phase increments the time range by a unit of time, and at each timestamp of the increment a new key-value pair is created.

In embodiments, a request is received to perform a set of map reduce jobs that generate cross products from a dataset based on join field. In the illustrated example, input 472 is received by mapper 471. The input 472 can include the dataset on which to perform the set of map reduce jobs. As illustrated, the dataset includes 2 entries, which include data. For example, entry 473 includes the data "User 2 Session: 12:01-12:02." The join field can be included as a parameter in the request to perform the set of map reduce jobs. In the current example, the join field is "range of time," which indicates that keys are to generated based on the "range of time field" of the entries of the dataset and the cross product is to be generated for a subset of the dataset that are associated with an identical key (e.g., identical time stamp).

In some embodiments, map phase 470 identifies a unit of time parameter associated with the request to generate the cross products. The unit of time parameter indicates a unit of time. In the current example, the unit of time is 1 minute. The unit of time can set to any value such as in hours, days, etc.

In embodiments, for each entry of the dataset, mapper 471 identifies data in range of time data field in the entry. The data in the range of time field can be referred to as a range of time. The mapper 471 increments the range of time by the unit of time. The incrementing starts from an earliest time identified by the range of time to a last time identified by range of time. At each increment, a timestamp is generated that that reflects a time in the range of time at the increment. The mapper 471 generates one or more key-value pairs for the entry based on the incrementing. The key of the one or more key-value pairs identifies the timestamp of the increment. A value of the one or more key-value pairs identifies data of the entry. In embodiments, the mapper 471 generates the groups of key-value pairs. Each key-value pair of a respective group of key-value pairs comprises an identical timestamp.

For example, entry 476 includes the time range "12:01-12:03" and entry 473 includes the time range "12:01-12:02." The unit of time is one minute. For entry 476, mapper starts with the earliest time identified by the range of time "12:01-12:03," which is "12:01" and increments the earliest time by one minute (e.g., 12:02). "12:02" is the timestamp that is generated that reflects a time in the range of time at the increment. The range of time "12:01-12:03" is incremented again by one minute to "12:03." "12:03" is the timestamp and the last time identified by the time range. The timestamps "12:02" and "12:03" become the keys, and the values are the data in the respective entry (e.g., "User 1 Session: 12:01-12:03"). The resultant key-value pairs are grouped by key in group of key-value pairs 475A and 475B, and passed to the reducer phase of the map reduce job 400 of FIG. 4A.

Figure 5:
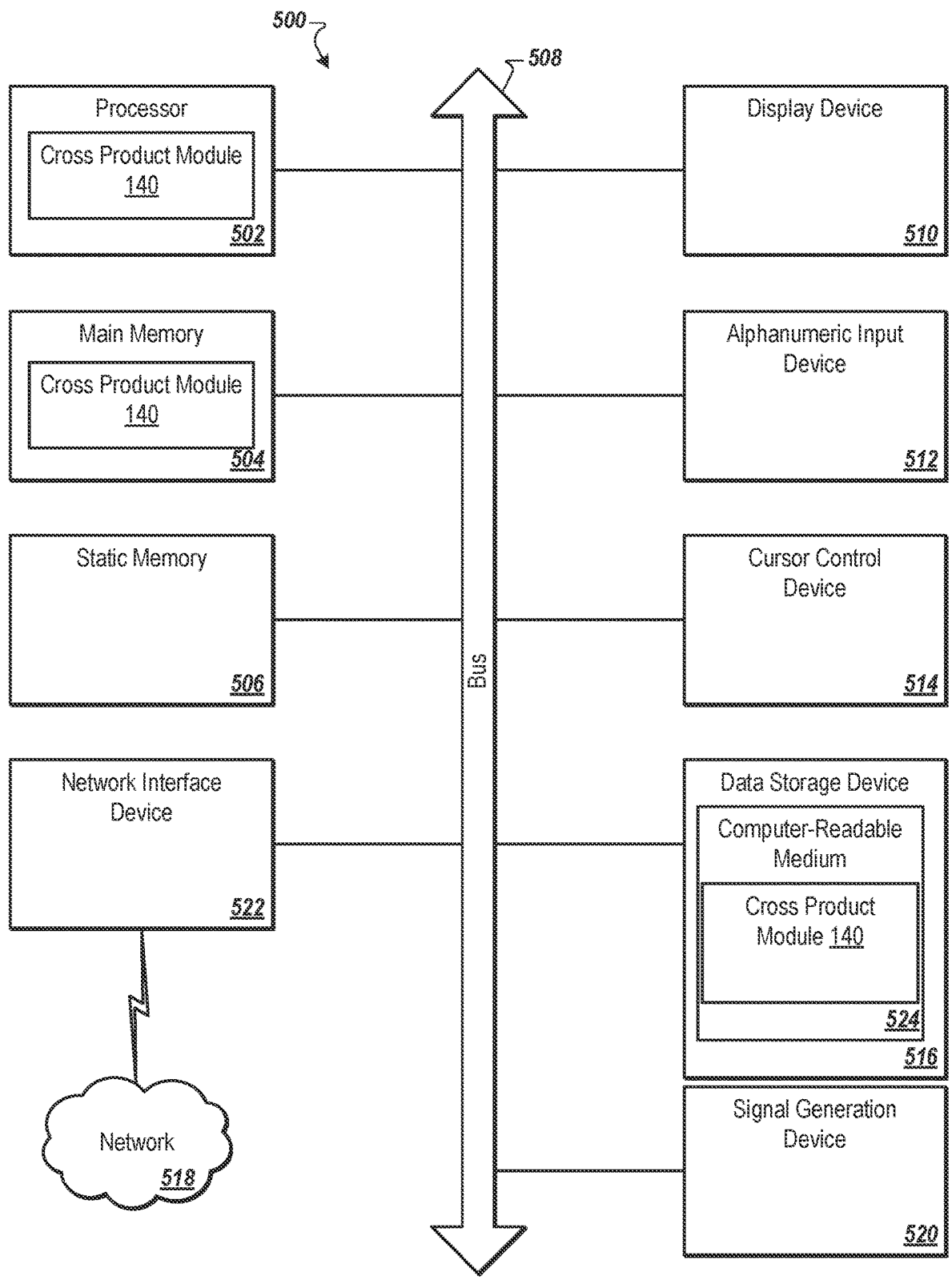
FIG. 5 is a block diagram illustrating an exemplary computer system, in accordance with embodiments of the disclosure.

FIG. 5 is a block diagram illustrating an exemplary computer system 500, in accordance with embodiments. The computer system 500 executes one or more sets of instructions that cause the machine to perform any one or more of the methodologies discussed herein. Set of instructions, instructions, and the like may refer to instructions that, when executed computer system 500, cause computer system 500 to perform one or more operations of cross product module 140. The machine may operate in the capacity of a server or a client device in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 516, which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute instructions of the system architecture 100 and the cross product module 140 for performing the operations discussed herein.

The computer system 500 may further include a network interface device 522 that provides communication with other machines over a network 518, such as a local area network (LAN), an intranet, an extranet, or the Internet. The computer system 500 also may include a display device 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a non-transitory computer-readable storage medium 524 on which is stored the sets of instructions of the system architecture 100 and cross product module 140 embodying any one or more of the methodologies or operations described herein. The sets of instructions of the system architecture 100 and cross product module 140 may also reside, completely or at least partially, within the main memory 504 and/or within the processing device 502 during execution thereof by the computer system 500, the main memory 504 and the processing device 502 also constituting computer-readable storage media. The sets of instructions may further be transmitted or received over the network 518 via the network interface device 522.

While the example of the computer-readable storage medium 524 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operation s leading to a desired result. The sequence of operations is those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "hosting," "determining," "receiving," "providing," "sending," "identifying," "monitoring," "increasing," "performing," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" or the like throughout is not intended to mean the same implementation or embodiment unless described as such. One or more implementations or embodiments described herein may be combined in a particular implementation or embodiment. The terms "first," "second," "third," "fourth," etc. as used herein are meant as labels to distinguish among different elements and may not necessarily have an ordinal meaning according to their numerical designation.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

What is claimed:

1. A method, comprising:
receiving, by a processing device, a request to perform a set of map reduce jobs that generate a plurality of cross products from a dataset based on a join field, wherein the join field indicates that each of the plurality of cross products is to be generated from data of a single subset of a plurality of subsets of the dataset;
responsive to receiving the request to perform the set of map reduce jobs, performing the set of map reduce jobs on the dataset to generate final output data comprising the plurality of cross products, wherein performing the set of map reduce jobs comprises distributing map reduce operations of the set of map reduce jobs to respective nodes for processing in parallel; and
storing the final output data of the set of map reduce jobs.

2. The method of claim 1, wherein each subset of the plurality of subsets is associated with identical keys, wherein performing the set of map reduce jobs generates groups of key value pairs from the plurality of subsets of the dataset, and wherein each key value pair of a respective group of key value pairs comprise the identical keys.

3. The method of claim 1, wherein the join field indicates that each of the plurality of cross products is to be generated on a per-key basis such that each of the plurality of cross products is to be generated from a corresponding subset associated with an identical key.

4. The method of claim 2, wherein performing the set of map reduce jobs on the dataset to generate the plurality of cross products comprises:
performing a first map phase of a first job of the set of map reduce jobs to generate first intermediate data using the dataset, wherein the first intermediate data comprises the groups of key-value pairs, wherein key-value pairs from different ones of the groups of key-value pairs have non-identical keys; and
performing a first reduce phase of the first job of the set of map reduce jobs to generate first output data using the first intermediate data, wherein the first output data comprises a first group of the groups of key-value pairs with first modified keys that indicate a sorting order and a number of key-value pairs in the first group of key-value pairs.

5. The method of claim 4, wherein performing the first map phase of the first job of the set of map reduce jobs to generate the first intermediate data using the dataset comprises:
identifying a parameter associated with the request to generate the plurality of cross products, wherein the parameter indicates a unit of time;
for each entry of the dataset,
identifying a range of time indicated in the entry;
incrementing the range of time by the unit of time, wherein the incrementing starts from an earliest time identified by the range of time to a last time identified by range of time, wherein at each increment a timestamp is generated that that reflects a time in the range of time at the increment; and
generating one or more key-value pairs for the entry based on the incrementing, wherein a key of the one or more key-value pairs identifies the timestamp of the increment, and wherein a value of the one or more key-value pairs identifies data of the entry; and
generating the groups of key-value pairs, wherein each key-value pair of a respective group of key-value pairs comprises an identical timestamp.

6. The method of claim 4, wherein performing the set of map reduce jobs on the dataset to generate the plurality of cross products further comprises:
performing a second map phase of a second job of the set of map reduce jobs to generate second intermediate data using the first output data of the first job, wherein the second intermediate data comprises the first group of key-value pairs comprising the first modified keys; and
performing a second reduce phase of the second job of the set of map reduce jobs to generate second output data using the second intermediate data, wherein the second output data comprises first subgroups of the first group of key-value pairs with second modified keys, wherein the first modified keys of the first group of key-value pairs are modified to generate the second modified keys that identify the first subgroups of the first group of key-value pairs.

7. The method of claim 6, wherein performing the second reduce phase of the second job of the set of map reduce jobs to generate the second output data using the second intermediate data comprises:
sorting key-value pairs of the first group of key-value pairs in the sorting order identified by the first modified keys;
identifying a number of key-value pairs in the first group of key-value pairs indicated by an initial key-value pair of the sorted key-value pairs;
determining a number of key-value pairs for each of the first subgroups of key- value pairs for the first group of key-value pairs, wherein the number of key-value pairs in the first subgroups does not exceed a maximum number of key-value pairs; and
generating the second modified keys for the first subgroups of key-value pairs such that the second modified keys identify a particular subgroup from first subgroups and that the particular subgroup does not exceed the maximum number of key-value pairs.

8. The method of claim 6, wherein performing the set of map reduce jobs on the dataset to generate the plurality of cross products further comprises:
performing a third map phase of a third job of the set of map reduce jobs to generate third intermediate data using the second output data of the second job, wherein the third intermediate data comprises the first subgroups of key-value pairs; and
performing a third reduce phase of the third job of the set of map reduce jobs to generate third output data using the third intermediate data, wherein the third output data comprises second subgroups of key-value pairs generated from the first subgroups of key-value pairs, wherein the second subgroups of key-value pairs comprise the first subgroups of key-value pairs and duplicate key-value pairs of the first subgroups of key-value pair, wherein at least the keys of the of the duplicated key-value pairs are modified.

9. The method of claim 8, wherein performing the set of map reduce jobs on the dataset to generate the plurality of cross products further comprises:
performing a fourth map phase of a fourth job of the set of map reduce jobs to generate fourth intermediate data using the third output data of the third job, wherein the fourth intermediate data comprises the second subgroups of key-value pairs; and
performing a fourth reduce phase of the fourth job of the set of map reduce jobs to generate fourth output data using the fourth intermediate data, wherein each reducer of the fourth reduce phase receives respective key-value pairs of the fourth intermediate data that have identical keys, wherein at each reducer each value of the respective key-values pairs is paired with every remaining value of the respective key-values pairs to generate new values with new keys, wherein the fourth output data comprises the new key-value pairs from each of the reducers of the fourth job.

10. The method of claim 9, wherein performing the set of map reduce jobs on the dataset to generate the plurality of cross products further comprises:
performing a fifth map phase of a fifth job of the set of map reduce jobs to generate fifth intermediate data using the fourth output data of the fourth job, wherein the fifth intermediate data comprises the new key-value pairs from each of the reducers of the fourth job; and
performing a fifth reduce phase of the fifth job of the set of map reduce jobs to perform a deduplication operation to remove duplicate key-value pairs from the new key-value pairs from each of the reducers of the fourth job and to provide the cross product of the plurality of cross products for the first group of key-value pairs.

11. A system comprising:
a memory; and
a processing device, coupled to the memory, to:
receive a request to perform a set of map reduce jobs that generate a plurality of cross products from a dataset based on a join field, wherein the join field indicates that each of the plurality of cross products is to be generated from data of a single subset of a plurality of subsets of the dataset;
responsive to receiving the request to perform the set of map reduce jobs, perform the set of map reduce jobs on the dataset to generate final output data comprising the plurality of cross products, wherein to perform the set of map reduce jobs comprises map reduce operations of the set of map reduce jobs to respective nodes for processing in parallel; and
store the final output data of the set of map reduce jobs.

12. The system of claim 11, wherein each subset of the plurality of subsets is associated with identical keys, wherein performing the set of map reduce jobs generates groups of key value pairs from the plurality of subsets of the dataset, and wherein each key value pair of a respective group of key value pairs comprise the identical keys.

13. The system of claim 11, wherein the join field indicates that each of the plurality of cross products is to be generated on a per-key basis such that each of the plurality of cross products is to be generated from a corresponding subset associated with an identical key.

14. The system of claim 12, wherein to perform the set of map reduce jobs on the dataset to generate the plurality of cross products, the processing device further to:
perform a first map phase of a first job of the set of map reduce jobs to generate first intermediate data using the dataset, wherein the first intermediate data comprises the groups of key-value pairs, wherein key-value pairs from different ones of the groups of key-value pairs have non-identical keys; and
perform a first reduce phase of the first job of the set of map reduce jobs to generate first output data using the first intermediate data, wherein the first output data comprises a first group of the groups of key-value pairs with first modified keys that indicate a sorting order and a number of key-value pairs in the first group of key-value pairs.

15. The system of claim 14, wherein to perform the first map phase of the first job of the set of map reduce jobs to generate the first intermediate data using the dataset, the processing device further to:
identify a parameter associated with the request to generate the plurality of cross products, wherein the parameter that indicates a unit of time;
for each entry of the dataset,
identify a range of time indicated in the entry;
increment the range of time by the unit of time, wherein the incrementing starts from an earliest time identified by the range of time to a last time identified by range of time, wherein at each increment a timestamp is generated that that reflects a time in the range of time at the increment; and
generate one or more key-value pairs for the entry based on the incrementing, wherein a key of the one or more key-value pairs identifies the timestamp of the increment, and wherein a value of the one or more key-value pairs identifies data of the entry; and
generate the groups of key-value pairs, wherein each key-value pair of a respective group of key-value pairs comprises an identical timestamp.

16. The system of claim 14, wherein to perform the first map phase of the first job of the set of map reduce jobs to generate the first intermediate data using the dataset, the processing device further to:
perform a second map phase of a second job of the set of map reduce jobs to generate second intermediate data using the first output data of the first job, wherein the second intermediate data comprises the first group of key-value pairs comprising the first modified keys; and
perform a second reduce phase of the second job of the set of map reduce jobs to generate second output data using the second intermediate data, wherein the second output data comprises first subgroups of the first group of key-value pairs with second modified keys, wherein the first modified keys of the first group of key-value pairs are modified to generate the second modified keys that identify the first subgroups of the first group of key-value pairs.

17. The system of claim 16, wherein to perform the first map phase of the first job of the set of map reduce jobs to generate the first intermediate data using the dataset, the processing device further to:
perform a third map phase of a third job of the set of map reduce jobs to generate third intermediate data using the second output data of the second job, wherein the third intermediate data comprises the first subgroups of key-value pairs;
perform a third reduce phase of the third job of the set of map reduce jobs to generate third output data using the third intermediate data, wherein the third output data comprises second subgroups of key-value pairs generated from the first subgroups of key-value pairs, wherein the second subgroups of key-value pairs comprise the first subgroups of key-value pairs and duplicate key-value pairs of the first subgroups of key-value pair, wherein at least the keys of the of the duplicated key-value pairs are modified;
perform a fourth map phase of a fourth job of the set of map reduce jobs to generate fourth intermediate data using the third output data of the third job, wherein the fourth intermediate data comprises the second subgroups of key-value pairs; and
perform a fourth reduce phase of the fourth job of the set of map reduce jobs to generate fourth output data using the fourth intermediate data, wherein each reducer of the fourth reduce phase receives respective key-value pairs of the fourth intermediate data that have identical keys, wherein at each reducer each value of the respective key-values pairs is paired with every remaining value of the respective key-values pairs to generate new values with new keys, wherein the fourth output data comprises the new key-value pairs from each of the reducers of the fourth job.

18. The system of claim 17, wherein to perform the first map phase of the first job of the set of map reduce jobs to generate the first intermediate data using the dataset, the processing device further to:
perform a fifth map phase of a fifth job of the set of map reduce jobs to generate fifth intermediate data using the fourth output data of the fourth job, wherein the fifth intermediate data comprises the new key-value pairs from each of the reducers of the fourth job; and perform a fifth reduce phase of the fifth job of the set of map reduce jobs to perform a deduplication operation to remove duplicate key-value pairs from the new key-value pairs from each of the reducers of the fourth job and to provide the cross product of the plurality of cross products for the first group of key-value pairs.

19. A non-transitory computer-readable medium comprising instructions that, responsive to execution by a processing device, cause the processing device to perform operations comprising:
   receiving, by the processing device, a request to perform a set of map reduce jobs that generate a plurality of cross products from a dataset based on a join field, wherein the join field indicates that each of the plurality of cross products is to be generated from data of a single subset of a plurality of subsets of the dataset;
   responsive to receiving the request to perform the set of map reduce jobs, performing the set of map reduce jobs on the dataset to generate final output data comprising the plurality of cross products, wherein performing the set of map reduce jobs comprises distributing map reduce operations of the set of map reduce jobs to respective nodes for processing in parallel; and
   storing the final output data of the set of map reduce jobs.

20. The non-transitory computer-readable medium of claim 19, wherein each subset of the plurality of subsets is associated with identical keys, wherein performing the set of map reduce jobs generates groups of key value pairs from the plurality of subsets of the dataset, and wherein each key value pair of a respective group of key value pairs comprise the identical keys.

* * * * *